United States Patent
Qiao et al.

(10) Patent No.: US 11,743,063 B2
(45) Date of Patent: *Aug. 29, 2023

(54) CHARGING CONTROL FOR NON-PUBLIC NETWORK

(71) Applicant: Ofinno, LLC, Reston, VA (US)

(72) Inventors: Weihua Qiao, Herndon, VA (US); Esmael Hejazi Dinan, McLean, VA (US); Kyungmin Park, Vienna, VA (US); Peyman Talebi Fard, Vienna, VA (US); Jayshree Bharatia, Plano, TX (US); Jinsook Ryu, Oakton, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,554

(22) Filed: Jan. 31, 2022

(65) Prior Publication Data

US 2022/0158858 A1 May 19, 2022

Related U.S. Application Data

(63) Continuation of application No. 17/166,179, filed on Feb. 3, 2021, now Pat. No. 11,245,539, which is a
(Continued)

(51) Int. Cl.
*H04L 12/14* (2006.01)
*H04W 76/18* (2018.01)
(Continued)

(52) U.S. Cl.
CPC ......... *H04L 12/1407* (2013.01); *H04W 76/11* (2018.02); *H04W 76/18* (2018.02); *H04W 80/10* (2013.01)

(58) Field of Classification Search
CPC ... H04L 12/1407; H04W 76/11; H04W 76/18; H04W 80/10; H04W 4/24; H04M 15/66
See application file for complete search history.

(56) References Cited

U.S. PATENT DOCUMENTS 9,467,542 B1 10/2016 Messenger et al.
10,299,128 B1 5/2019 Suthar et al.
(Continued)

FOREIGN PATENT DOCUMENTS

JP 2015-532058 A 11/2015
JP 2018-502501 A 1/2018
(Continued)

OTHER PUBLICATIONS

C1-191153; 3GPP TSG-CT WG1 Meeting #115; Montreal (Canada), Feb. 25-Mar. 1, 2019; Source: Ericsson; Title: Discussion to SNPN selection; Agenda item: 16.1.2; Document for: Agreement.
(Continued)

*Primary Examiner* — Will W Lin
(74) *Attorney, Agent, or Firm* — Sachin Kandhari; Kavon Nasabzadeh; Philip R. Smith

(57) ABSTRACT

A session management function (SMF) comprises one or more processors and memory storing instructions. When executed by the one or more processors, the instructions cause the SMF to send, to a policy control function (PCF), a policy request message. The policy request message comprises a non-public network (NPN) identifier of an NPN through which a wireless device accesses a public land mobile network (PLMN) and a PLMN identifier of the PLMN. When executed by the one or more processors, the instructions cause the SMF to receive, from the PCF, a policy response message comprising a charging control policy.

20 Claims, 26 Drawing Sheets

Related U.S. Application Data continuation of application No. PCT/US2020/025696, filed on Mar. 30, 2020.

(60) Provisional application No. 62/826,486, filed on Mar. 29, 2019.

(51) Int. Cl.
*H04W 76/11* (2018.01)
*H04W 80/10* (2009.01)

(56) References Cited

U.S. PATENT DOCUMENTS

| | | | |
|---|---|---|---|
| 10,931,829 B1* | 2/2021 | Paczkowski | H04L 12/14 |
| 2015/0237594 A1 | 8/2015 | Zhou et al. | |
| 2016/0156479 A1 | 6/2016 | Baek et al. | |
| 2018/0309755 A1 | 10/2018 | Mishra | |
| 2018/0352483 A1* | 12/2018 | Youn | H04W 76/11 |
| 2019/0053104 A1* | 2/2019 | Qiao | H04W 28/24 |
| 2019/0191467 A1* | 6/2019 | Dao | H04W 76/10 |
| 2019/0246282 A1* | 8/2019 | Li | H04W 12/041 |
| 2019/0379544 A1 | 12/2019 | Suthar et al. | |
| 2020/0245235 A1* | 7/2020 | Chun | H04W 48/18 |
| 2020/0260525 A1* | 8/2020 | Gan | H04W 76/12 |
| 2020/0304408 A1* | 9/2020 | Suthar | H04L 67/141 |
| 2020/0374352 A1* | 11/2020 | Ge | H04W 76/10 |
| 2021/0099316 A1* | 4/2021 | Wang | H04W 4/24 |

FOREIGN PATENT DOCUMENTS

| | | |
|---|---|---|
| WO | 2016/094805 A1 | 6/2016 |
| WO | 2019035836 A1 | 2/2019 |
| WO | 2019/057305 A1 | 3/2019 |

OTHER PUBLICATIONS

Office Action, dated May 18, 2022, in CN Patent Application No. 2020800398027.
S2-175399; SA WG2 Meeting #122bis; Aug. 21-25, 2017, Sophia Antipolis, France; Source: Ericsson; Title: 23.502: PCF Services information; Document for: Approval; Agenda Item: 6.5.6 Policy and Charging Control; Work Item / Release: 5GS_ph1 / Rel15.
3GPP TS 22.261 V16.6.0 (Dec. 2018); Technical Specification; 3rd Generation Partnership Project; Technical Specification Group Services and System Aspects; Service requirements for the 5G system; Stage 1; (Release 16).
3GPP TS 23.501 V15.4.0 (Dec. 2018); Technical Specification; 3rd Generation Partnership Project; Technical Specification Group Services and System Aspects; System Architecture for the 5G System; Stage 2; (Release 15).
3GPP TS 23.502 V15.4.1 (Jan. 2019); Technical Specification; 3rd Generation Partnership Project; Technical Specification Group Services and System Aspects; Procedures for the 5G System; Stage 2; (Release 15).
3GPP TS 23.503 V15.4.0 (Dec. 2018); Technical Specification; 3rd Generation Partnership Project; Technical Specification Group Services and System Aspects; Policy and Charging Control Framework for the 5G System; Stage 2; (Release 15).
3GPP TR 23.734 V16.0.0 (Dec. 2018); Technical Report; 3rd Generation Partnership Project; Technical Specification Group Services and System Aspects; Study on enhancement of 5GS for Vertical and LAN Services (Release 16).
3GPP TS 29.061 V14.3.0 (Mar. 2017); Technical Specification; 3rd Generation Partnership Project; Technical Specification Group Core Network and Terminals; Interworking between the Public Land Mobile Network (PLMN) supporting packet based services and; Packet Data Networks (PDN).
3GPP TS 29.212 V14.4.0 (Jun. 2017); Technical Specification; 3rd Generation Partnership Project; Technical Specification Group Core Network and Terminals; Policy and Charging Control (PCC); Reference points (Release 14).
3GPP TS 32.255 V15.0.0 (Sep. 2018); Technical Specification; 3rd Generation Partnership Project; Technical Specification Group Services and System Aspects; Telecommunication management; Charging management;5G data connectivity domain charging.
S2-1810786 management of PDU Sessions_cl; 3GPP TSG-SA WG2 Meeting #129; 6; Dongguan, China, Oct. 15-Oct. 19, 2018(revision of S2-xxxx); Source:Huawei, HiSilicon; Title:Update to Solution 15: Management of PDU Sessions and UP paths; Document for:Approval; Agenda Item:6.15.1.
S2-1811019 was11344 was10787 support of traffic routing in Backbone UP_r3; 3GPP TSG-SA WG2 Meeting #129; 9 Dongguan, China, Oct. 15-Oct. 19, 2018(revision of S2-1811344); Source:Huawei, HiSilicon; Title:Update to Solution 15: Support of traffic routing in Backbone UP; Document for:Approval; Agenda Item:6.15.1.
S2-1811025(was1372)(was0585)_KI_privateNW_access_solution update#4; SA WG2 Meeting #129; 5 Oct. 15-19, 2018, Dongguan, China(was S2-18113720585); Title:Update on solution #4 for access to non-public networks; Source:Samsung, SK Telecom; Document for:Discussion/Approval.
S2-1811026-NetworkAccessControl; SA WG2 Meeting #129S2-18113731811026; Oct. 15-19, Dongguan, China (revision of S2-181xxxx); Source:Nokia, Nokia Shanghai Bell, Tencent; Title:Update to Solution #5 Access Control; Document for:Approval; Agenda Item:6.15.
S2-1811027_was_S2-1811375-was_S2-1810275 Non-standalone NPN; SA WG2 Meeting #129; 7 Oct. 15-Oct. 19, 2018, Dongguan, China(revision of S2-1811375); Source:Interdigital Inc.; Title:Solution for supporting Non-standalone NPN; Document for:Approval; Agenda Item:6.15.3.
S2-1811347 was S2-1810071_VertLAN_Update solution1; SA WG2 Meeting #129S2-181007118111347 Dongguan, P.R. China, Oct. 15-19, 2018(was S2-181xxyy1810071); Source:Qualcomm Incorporated; Title:Update to solution 1 and solution 2; Document for:Discussion/Approval.
S2-1811376_was10244-dual-radio; SA WG2 Meeting #S2-129; 6; Oct. 15-19, 2018, Dongguan, P.R. China(was S2-1810244); Source:Ericsson, Nokia, Nokia Shanghai Bell; Title:Vertical LAN: Access to PLMN services using Dual Radio in UE; Document for:Discussion/Approval.
S2-1811595 e-mail_revision_4_of 1811024; 3GPP TSG SA WG2 Meeting #129; 5; Oct. 15-19, 2018, Dongguan, China(revision of S2-1811024); Source:Intel, Nokia, Nokia Shanghai Bell; Title:Update to Solution#3; Document for:Approval; Agenda Item:6.15.3.
S2-1811724_5GLAN_analysis; SA WG2 Meeting #129-BIS; 4; Nov. 26-30, 2018, West Palm Beach, USA (revision of S2-18xxxxx); Source:Ericsson, Qualcomm Incorporated, Nokia, Nokia Shanghai Bell; Title:Analysis and conclusions on 5G-LAN solutions; Document for:Approval.
NPL18-S2-1813035-Vertical_LAN-v4; SA WG2 Meeting #129bis; 5; Nov. 26-30, 2018, West Palm Beach, Florida(revision of S2-18)axxx); Source:Nokia, Nokia Shanghai Bell, Qualcomm, SK Telecom, Telecom Italia, Charter communications, NTT DoCoMo, KDDI, Huawei, HiSilicon, Deutsche Telekom, Verizon, LG Electronics, Ericsson, ZTE, ETRI, Uangel, Intel, Mediatek, Samsung; Title:Proposed WID on Enhanced support of Vertical and LAN Services; Document for:Approval.
S2-1813050_was S2-1811736_VertLAN_KI1_2 non-stand-alone_conclusion; SA WG2 Meeting #129bis; 0 Nov. 26-30, 2018, West Palm Beach, USA(was S2-1811736); Source:Qualcomm Incorporated, Deutsche Telekom, Orange, NTT DoCoMo, Nokia, Nokia Shanghai Bell, Ericsson; Title:Overall evaluation and conclusion of key Issue 1 and 2 for non-public networks deployed as part of a PLMN; Document for:Discussion/Approval.
S2-1813179(was3165)(was3049)(was2224) Update on Solution #4 Separate subscriptions for NPN; SA WG2 Meeting #129Bis; 9; Nov. 26-30, 2018, West palm Beach, USA(wasS2-1813165); Source:Samsung, NTT Docomo, Huawei, Vivo; Title:Update of Solution #4: Support of NPN subscription; Document for:Approval; Agenda Item:6.15.3.
S2-1813338_was3036_5GLAN_analysis_v5; SA WG2 Meeting #129-BIS; 8; Nov. 26-30, 2018, West Palm Beach, USA(revision of S2-1813036); Source:Intel , Samsung; Title:Conclusions on 5G-LAN solutions; Document for: Approval.

(56) References Cited

OTHER PUBLICATIONS

S2-186182_SID VerticalServicesEnh-R8.2; SA WG2 Meeting #S2-127bis; Newport Beach, United States, May 28, 2018-Jun. 1, 2018(revision of S2-186045); Source:Nokia, Nokia Shanghai Bell, Qualcomm, SK Telecom, Telecom Italia, Siemens, Robert Bosch GmbH, Charter Communications, NTT DoCoMo, KDDI, Samsung, Huawei, HiSilicon, Deutsche Telekom, Verizon, Intel, Mediatek Inc, Sennheiser, BMWi, LG Electronics; Title:New SID on Enhanced support of Vertical and LAN Services; Document for:Approval.
S2-1901329_was_S2-1901109_was_S2-1900061_v2; 3GPP TSG-SA2 Meeting #130S2-1901329; Kochi, India, Jan. 21, 2019-Jan. 25, 2019; CR-Form-v11.4.
S2-1901337_was1208_was0093_5GLAN_general_aspects_v3; 3GPP TSG-SA WG2 Meeting #130; 7 Kochi, India, Jan. 21-25, 2019(revision of S2-1901208); CR-Form-v11.4.
S2-1901338 was1207 23501 5GLAN intro_v5.3; 3GPP TSG-SA WG2 Meeting #130; 8; Jan. 21-25, 2018, Kochi, India; CR-Form-v11.2.
S2-1901391_was01330_was01110_was00122_VLAN-23501-merged-QC-PH; 3GPP TSG-SA WG2 Meeting #130 ; 1 Jan. 21-25, Kochi, India; CR-Form-v11.1.
International Search Report and Written Opinion of the International Searching Authority dated Aug. 12, 2020 for International Application No. PCT/US2020/025696.
ETSI TS 129 512 V15.0.0 (Jun. 2018); Technical Specification; 5G; 5G System; Session Management Policy Control Service; Stage 3; (3GPP TS 29.512 version 15.0.0 Release 15).
Office Action, dated Feb. 2, 2023, in EP Patent Application No. 20722402.3.
Japanese Office Action, dated Jun. 5, 2023, in JP Patent Application No. 2021-557950.

\* cited by examiner

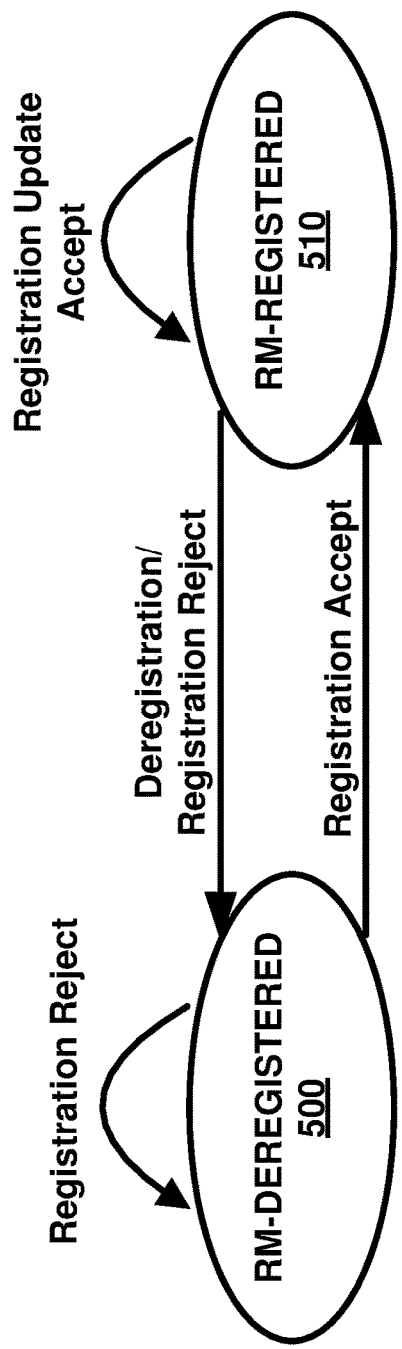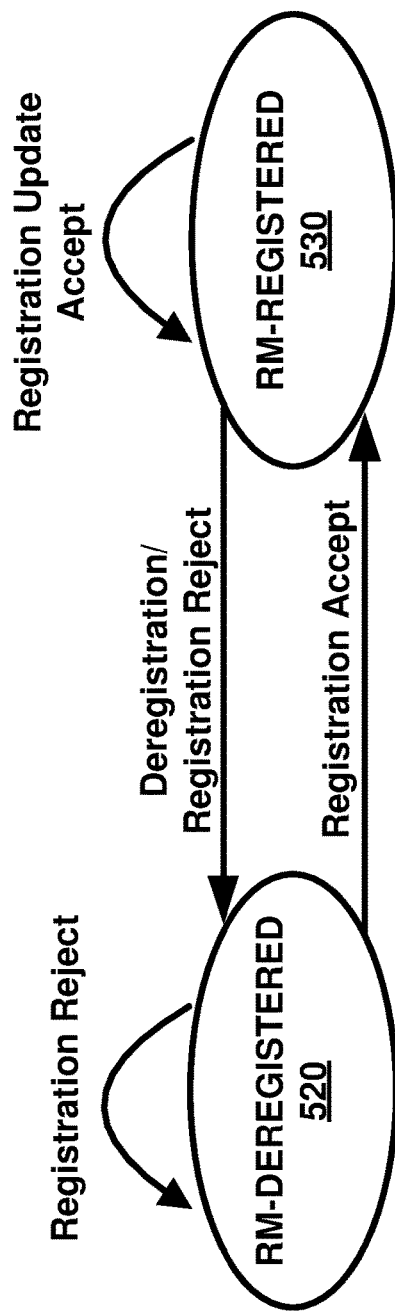
FIG. 5A
FIG. 5B

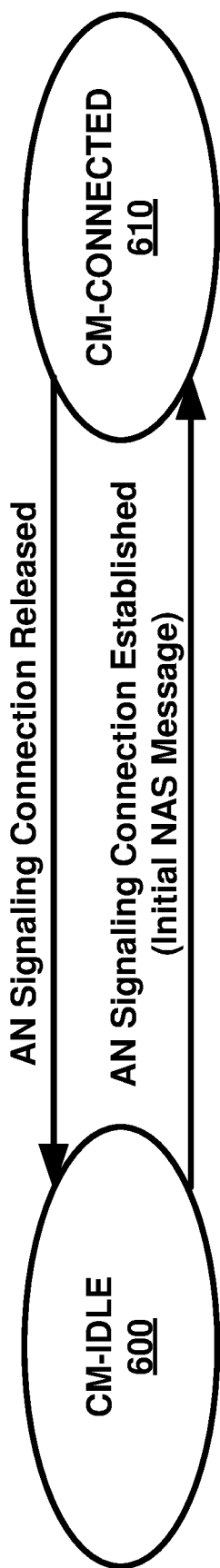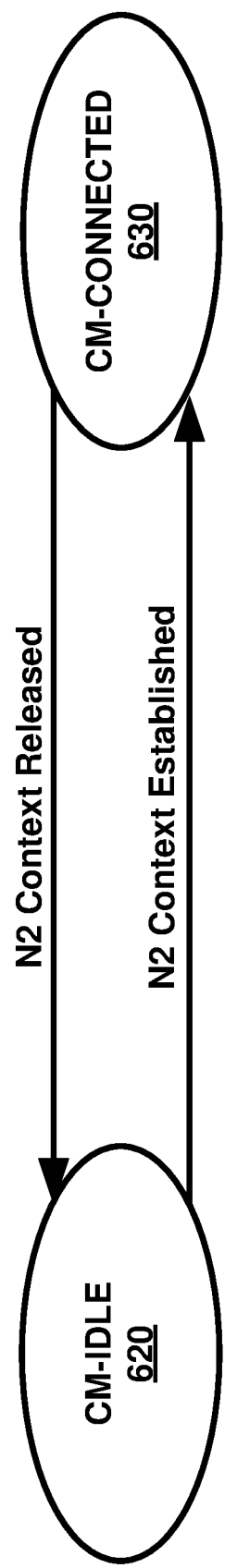

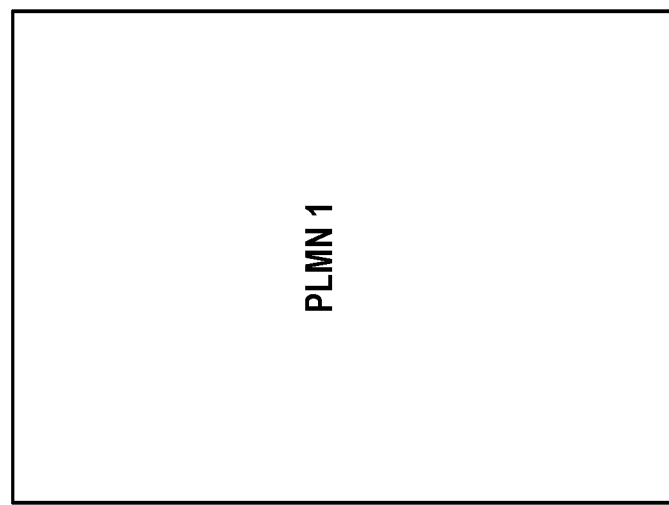
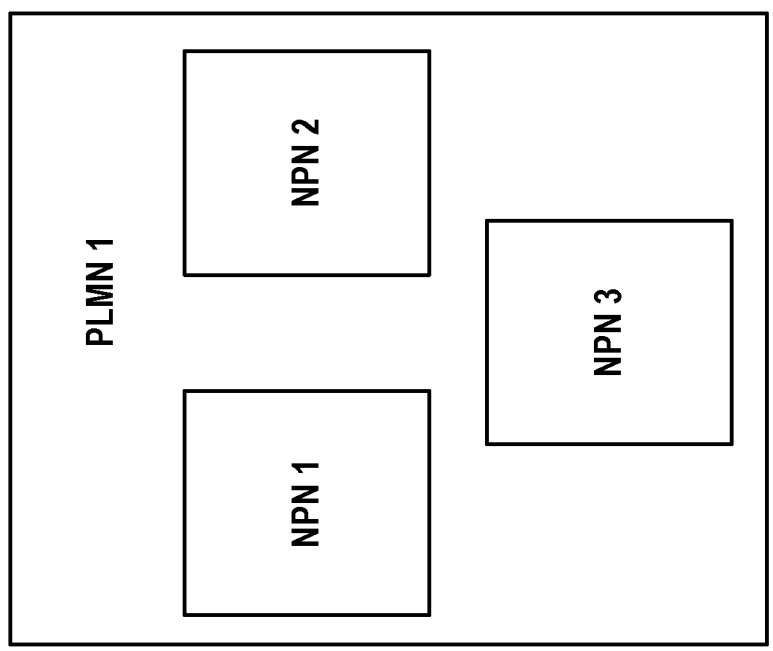
FIG. 12B
FIG. 12A send, by a SMF to a PCF, a policy request message comprising a NPN identifier of an NPN through which a wireless device accesses a PLMN and a PLMN identifier of the PLMN
2110 receive, by the SMF from the PCF, a policy response message comprising a charging control policy.
2120

CHARGING CONTROL FOR NON-PUBLIC NETWORK

CROSS-REFERENCE TO RELATED APPLICATIONS

This application is a continuation of U.S. application Ser. No. 17/166,179, filed Feb. 3, 2021, which is a continuation of International Application No. PCT/US2020/025696, filed Mar. 30, 2020, which claims the benefit of U.S. Provisional Application No. 62/826,486, filed Mar. 29, 2019, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 12A is an example diagram depicting a non-public network may be deployed as part of a PLMN, and FIG. 12B is an example diagram depicting a non-public network may be isolated from a PLMN as per an aspect of an embodiment of the present disclosure.

DETAILED DESCRIPTION OF EXAMPLES

Example embodiments of the present invention enable implementation of enhanced features and functionalities in 5G systems. More particularly, the embodiments of the technology disclosed herein may relate to charging control for non-public network (e.g. for 5G or future communication system). Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 1:
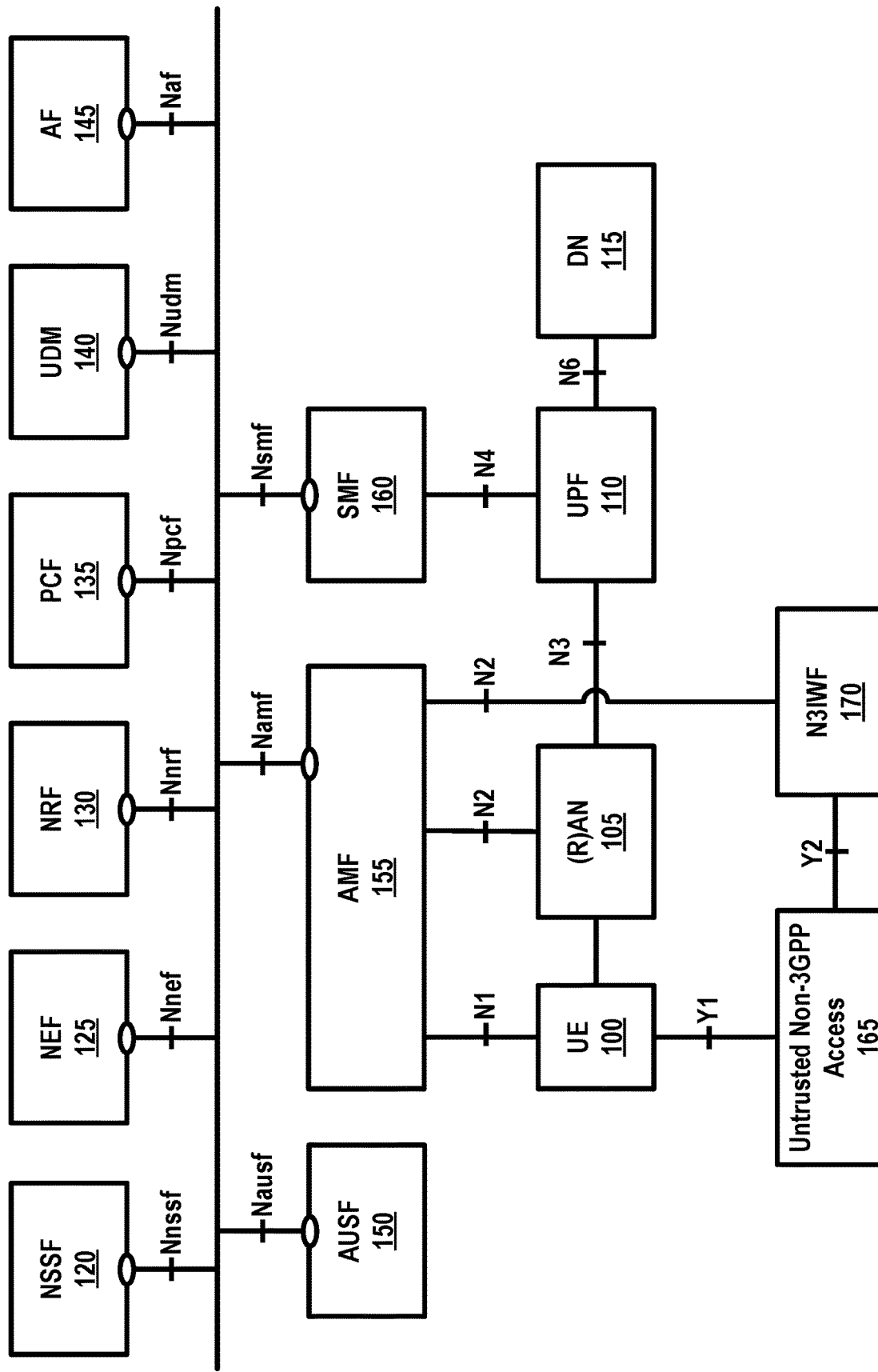
FIG. 1 is a diagram of an example 5G system architecture as per an aspect of an embodiment of the present disclosure.
Figure 2:
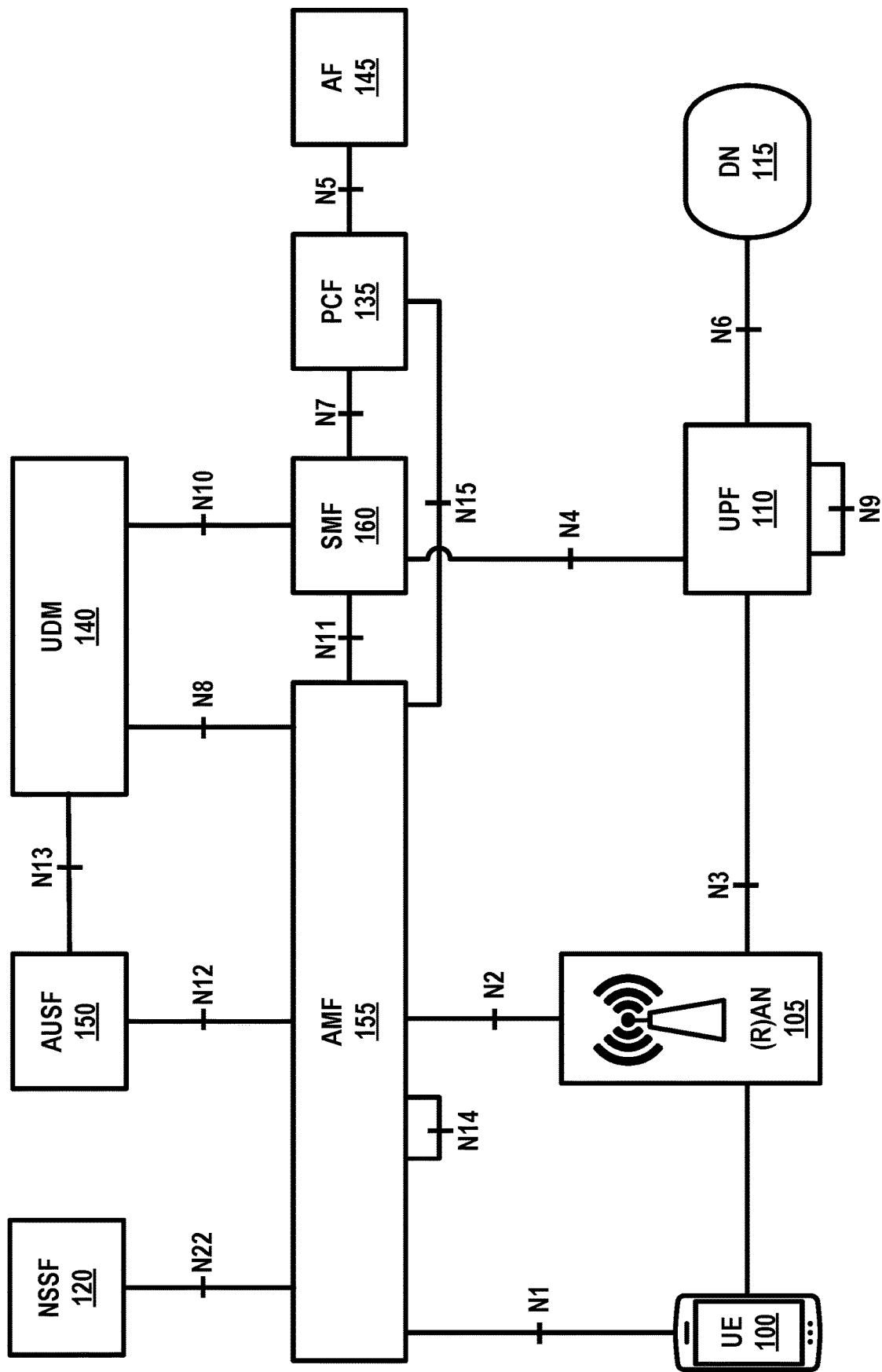
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMBR Aggregate Maximum Bit Rate
AMF Access and Mobility Management Function
AN Access Network
AUSF Authentication Server Function
ARP Allocation and Retention Priority
BD Billing Domain
CAG Closed Access Group
CDR Charging Data Record
CHF Charging Function
CN Core Network
CP Control Plane
DL Downlink
DN Data Network
DNN Data Network Name
FDD Frequency Division Duplex
FQDN Fully Qualified Domain Name
GPSI Generic Public Subscription Identifier
GW Gateway
HTTP Hypertext Transfer Protocol
ID Identifier
IMS IP Multimedia core network Subsystem
IP Internet Protocol
IP-CAN IP Connectivity Access Network
L2 Layer 2 (data link layer)
L3 Layer 3 (network layer)
LADN Local Area Data Network
LAN local area network MAC Media Access Control
MCC Mobile Country Codes
MNC Mobile Network Codes
MICO Mobile Initiated Connection Only
N3IWF Non-3GPP InterWorking Function
NAS Non Access Stratum
NAT Network address translation
NEF Network Exposure Function
NF Network Function
NR New Radio
NG-RAN NR Radio Access Network
NPN Non-Public Network
NRF Network Repository Function
NSI Network Slice Instance
NSSAI Network Slice Selection Assistance Information
NSSF Network Slice Selection Function
NWDAF Network Data Analytics Function
OAM Operation Administration and Maintenance
PCC Policy and Charging Control
PCF Policy Control Function
PDU Packet Data Unit
PEI Permanent Equipment Identifier
PLMN Public Land Mobile Network
QCI QoS Class Identifier
QFI QoS Flow Identifier
QoS Quality of Service
RA Random Access
RAN Radio Access Network
RAT Radio Access Technology
RRC Radio Resource Control
RM Registration Management
SBA Service Based Architecture
SIB System Information Block
SM Session Management
SMF Session Management Function
SMSF SMS Function
S-NSSAI Single Network Slice Selection Assistance information
SP Service Provider
SS Synchronization Signal
SSC Session and Service Continuity
SUPI Subscriber Permanent Identifier
TA Tracking Area
TAI Tracking Area Identity
UDR Unified Data Repository
UDM Unified Data Management
UE User Equipment
UL Uplink
UPF User Plane Function Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
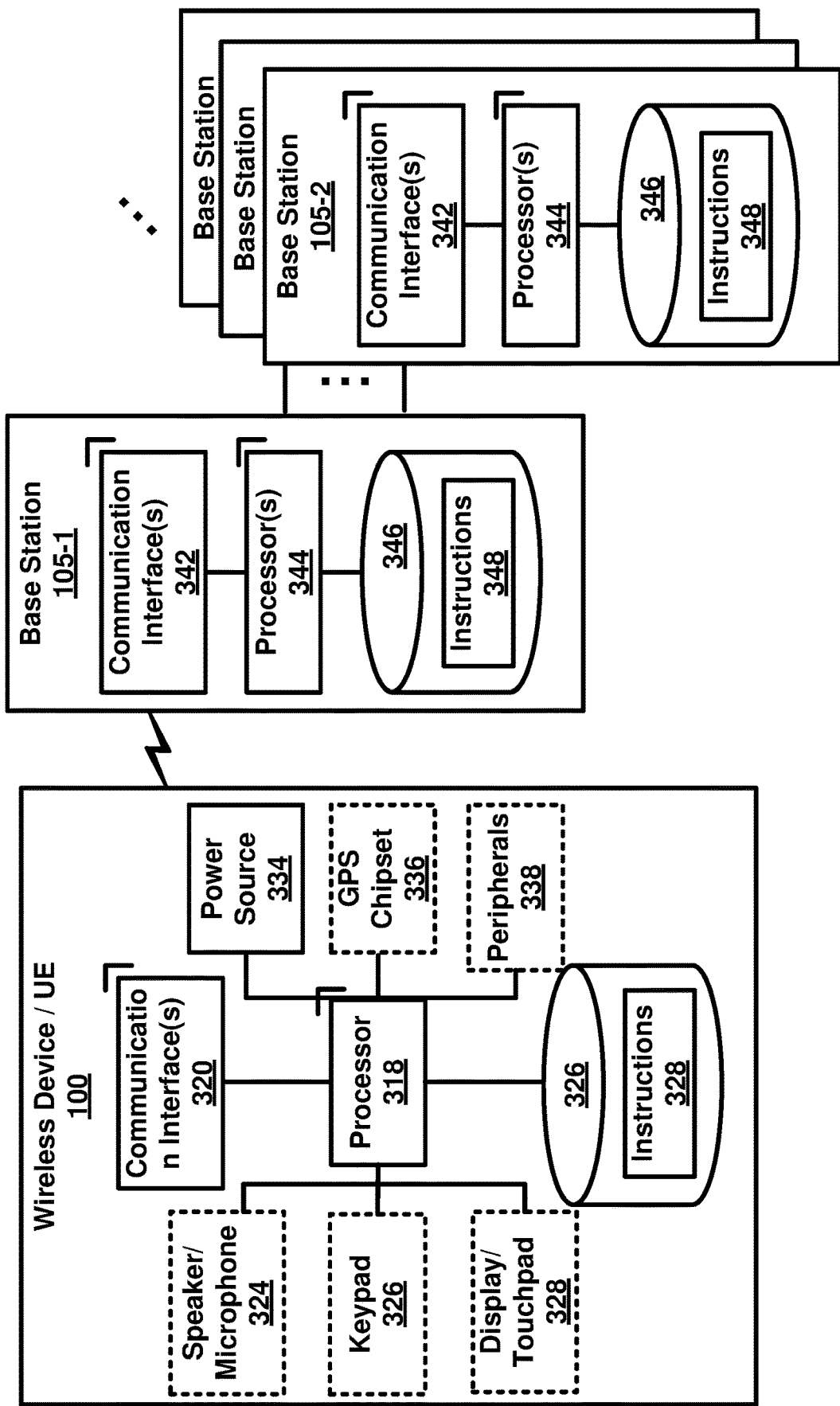
FIG. 3 is a system diagram of an example wireless device and a network node in a 5G system as per an aspect of an embodiment of the present disclosure.
Figure 4:
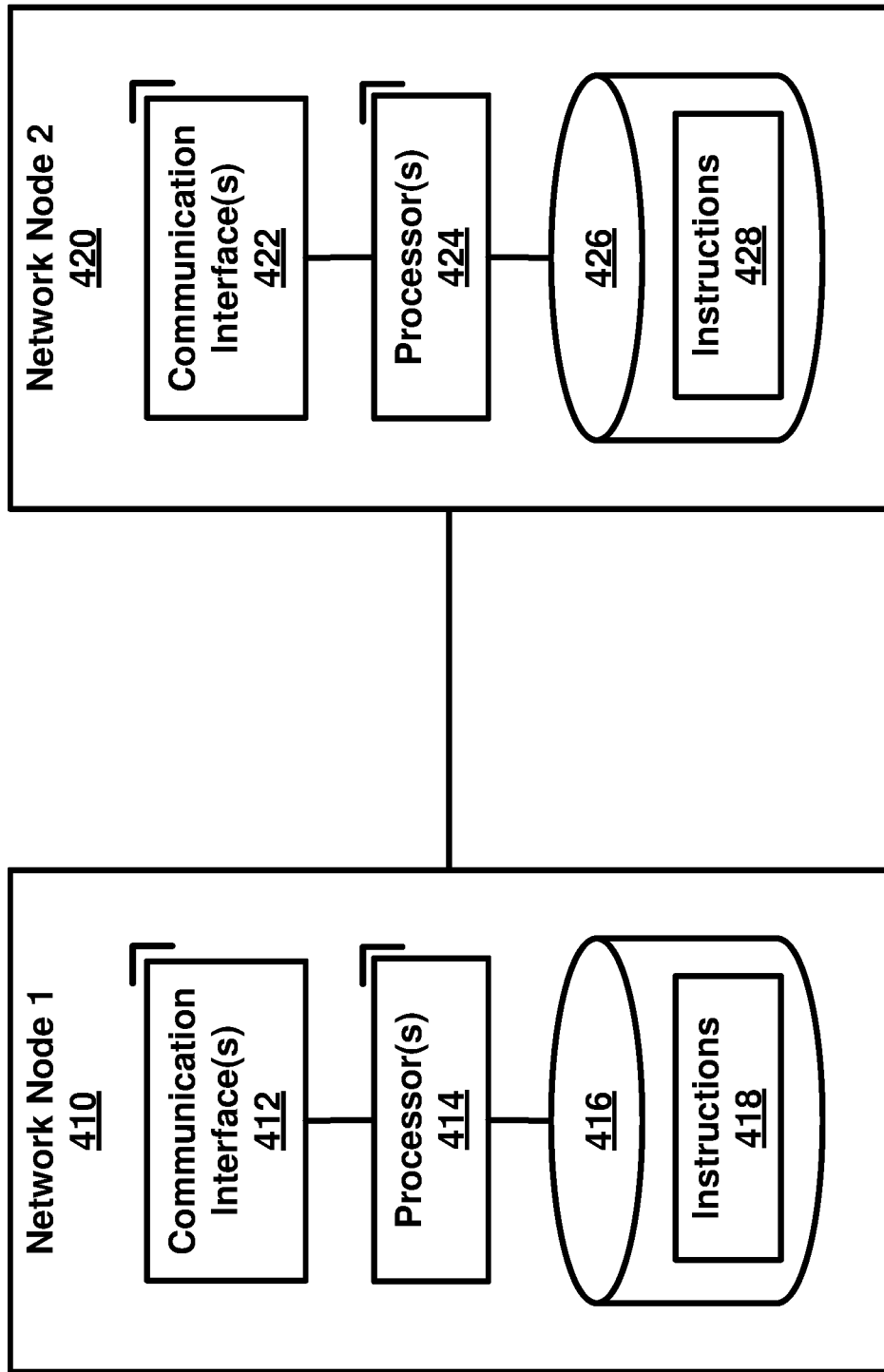
FIG. 4 is a system diagram of an example network nodes as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of an SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
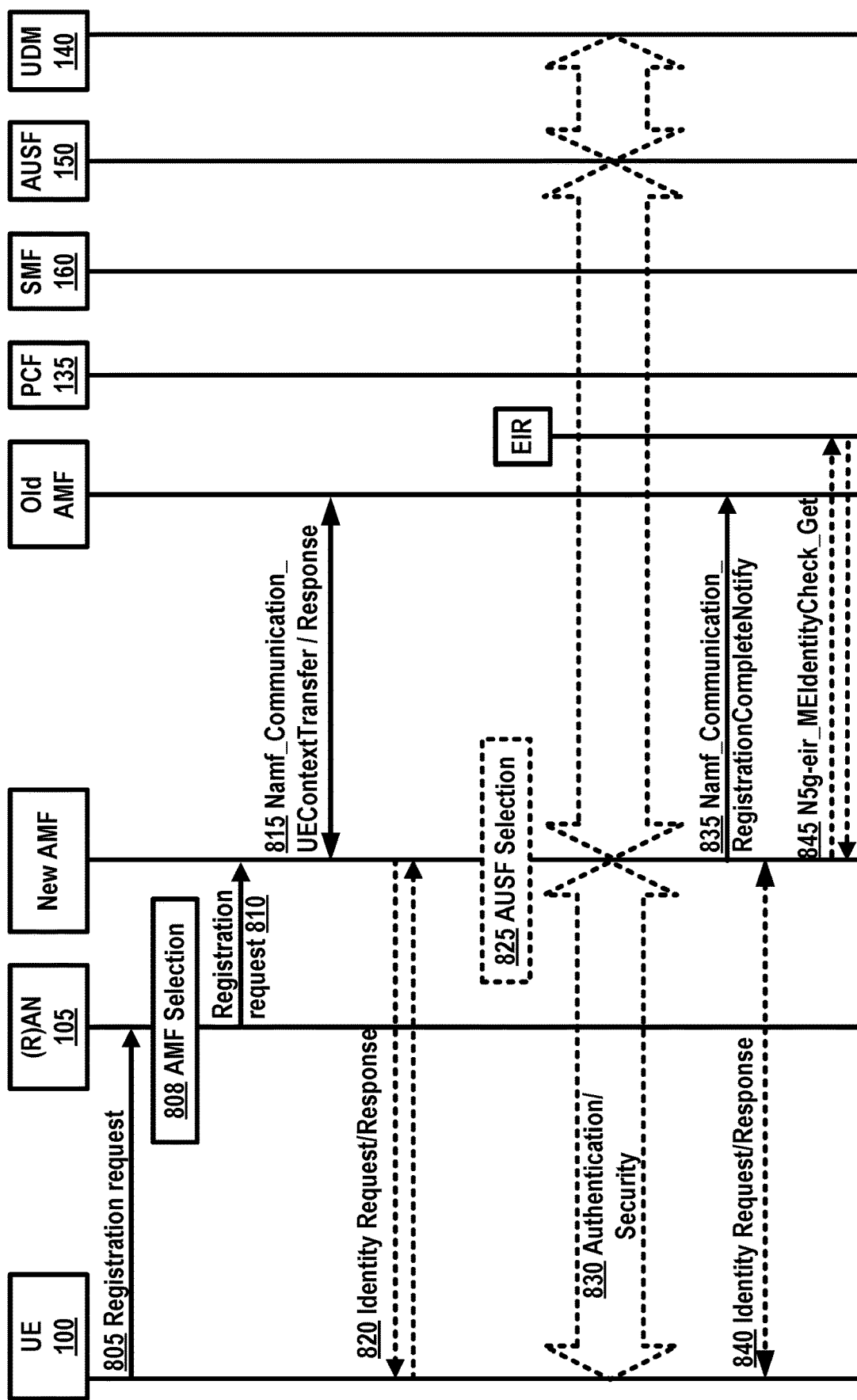
FIG. 8 and FIG. 9 is an example call flow for registration procedure as per an aspect of an embodiment of the present disclosure.
Figure 9:
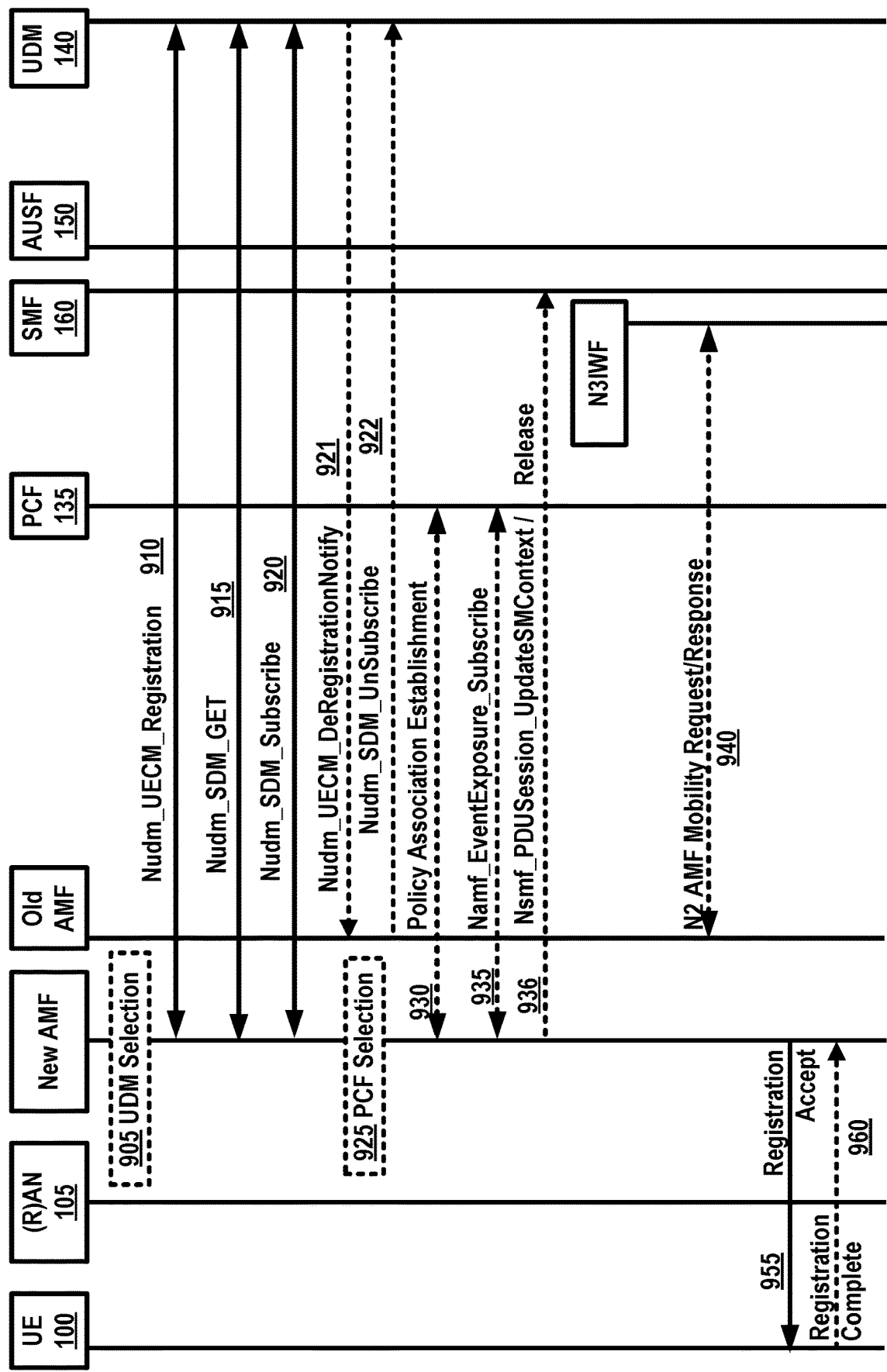

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
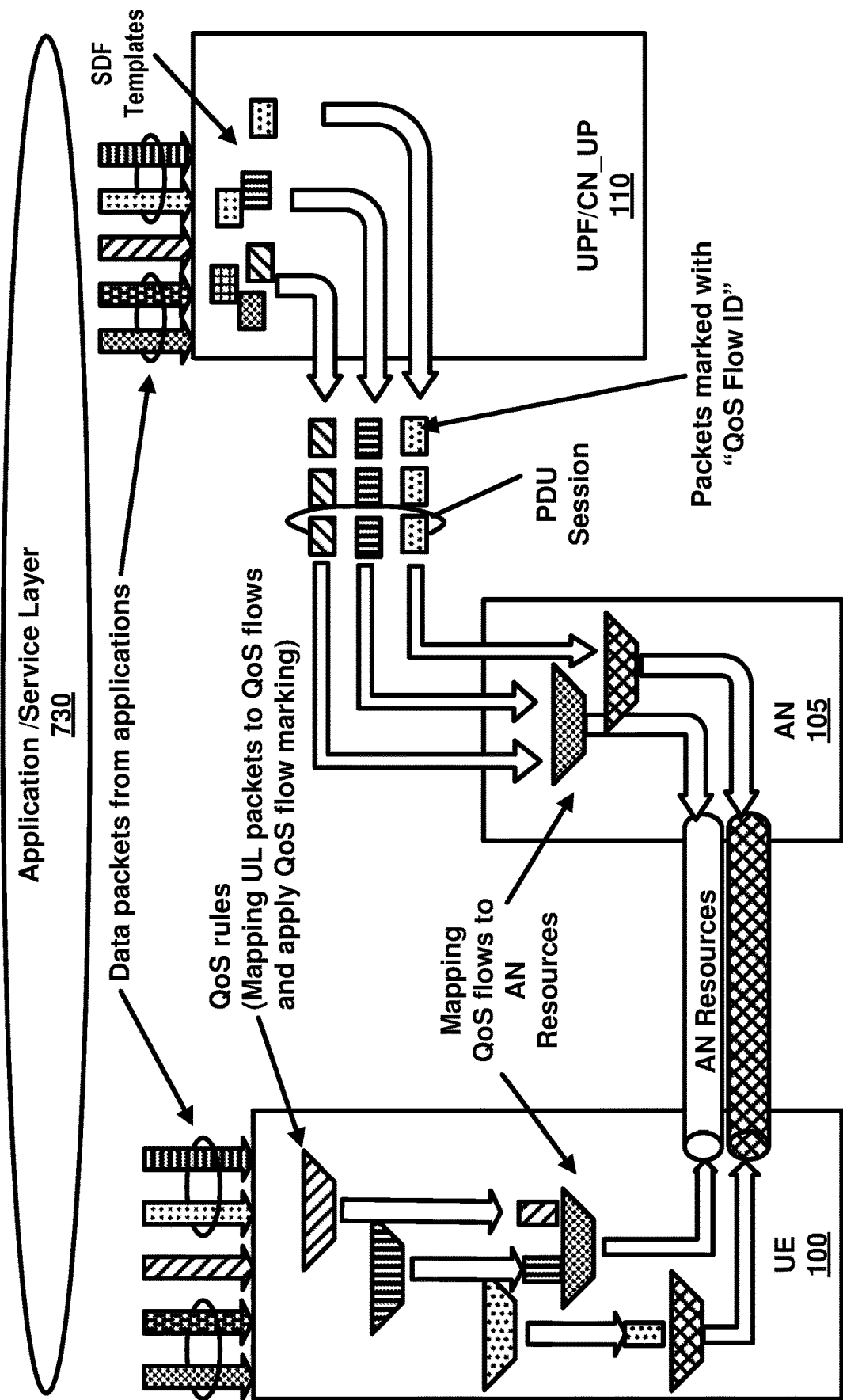
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEF 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAIs may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Nas_Communication_UEContextTransfer (complete registration request) 815. In an example, if the UE's 5G-GUTI was included in the registration request and the serving AMF 155 has changed since last registration procedure, the new AMF 155 may invoke the Nas_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Nas_Communication_UEContextTransfer (SUPI, MM context, SMF 160 information, PCF ID). In an example, the old AMF 155 may respond to the new AMF 155 for the Nas_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration, the AMF 155 may skip the authentication and security setup, or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Nas_Communication_RegistrationCompleteNotify 835. If the AMF 155 has changed, the new AMF 155 may notify the old AMF 155 that the registration of the UE 100 in the new AMF 155 may be completed by invoking the Nas_Communication_RegistrationCompleteNotify service operation. If the authentication/security procedure fails, then the registration may be rejected, and the new AMF 155 may invoke the Nas_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Nas_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_DM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-) PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(*s*) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
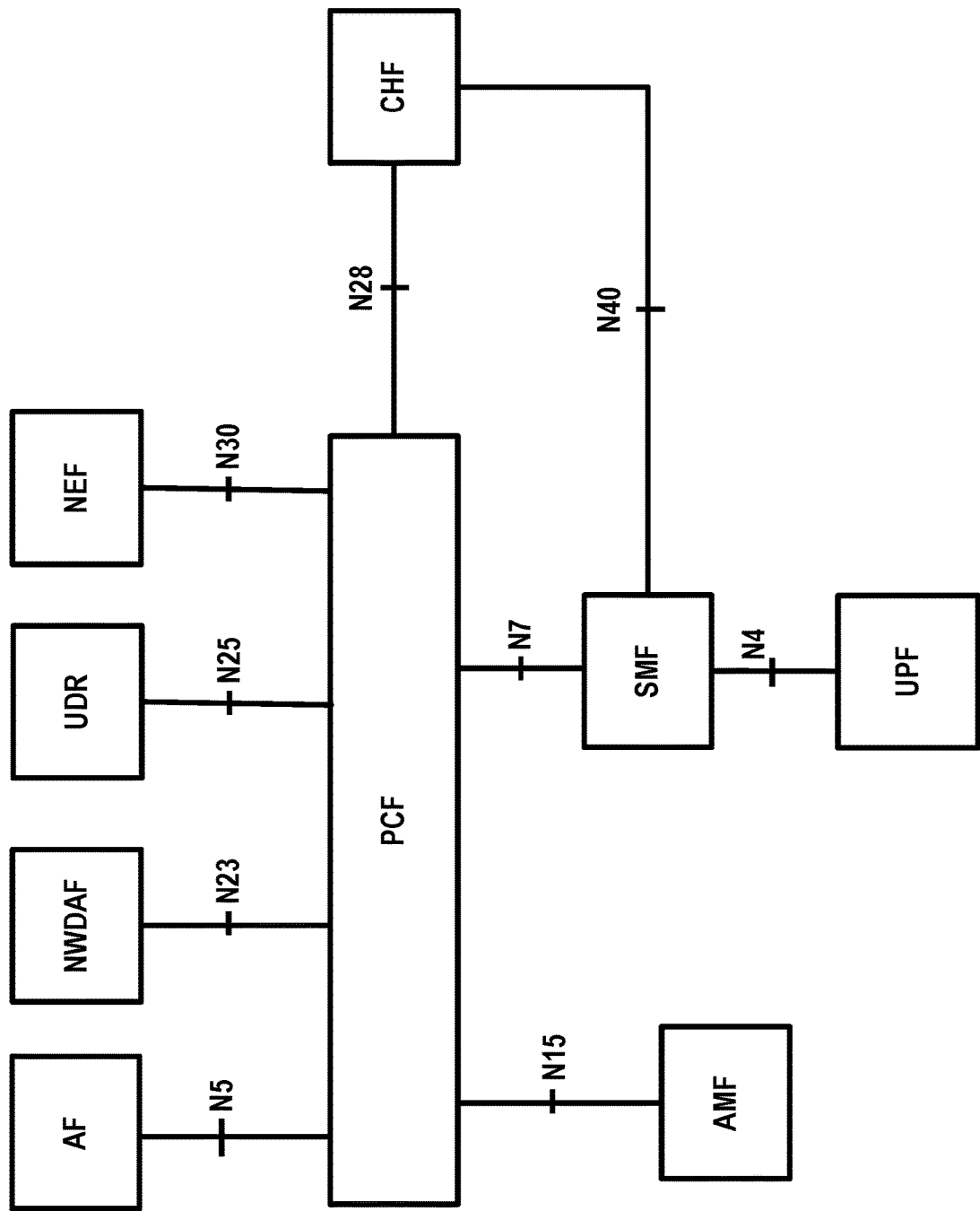
FIG. 10 is a diagram of an example 5G policy and charging control system architecture as per an aspect of an embodiment of the present disclosure.

In an example, FIG. 10 is a diagram of 5G policy and charging control system architecture. The reference architecture of policy and charging control framework for the 5G system may comprise one or more of the following network functions: policy control function (PCF), session management function (SMF), user plane function (UPF), access and mobility management function (AMF), network exposure functionality (NEF), network data analytics function (NWDAF), charging function (CHF), application function (AF) and unified data repository (UDR).

In an example, the CHF may support at least one charging method: offline charging, online charging, or converged charging.

In an example, the offline charging may be a process where charging information for network resource usage may be collected concurrently with that resource usage. At the end of the process, CDR files may be generated by the network, which may be transferred to a network operator's billing domain (BD) for the purpose of subscriber billing and/or inter-operator accounting (or additional functions, e.g. statistics, at the operator's discretion). The BD typically comprises post-processing systems such as the operator's billing system or billing mediation device. In an example conclusion, offline charging may be a mechanism where charging information does not affect, in real-time, the service rendered.

In an example, online charging may be a process where charging information for network resource usage may be collected concurrently with that resource usage in the same fashion as in offline charging. Authorization for the network resource usage may be obtained by the network prior to the actual resource usage to occur. In an example, the charging information utilized in online charging may be not necessarily identical to the charging information employed in offline charging. In an example conclusion, online charging may be a mechanism where charging information may affect, in real-time, the service rendered and therefore a direct interaction of the charging mechanism with the control of network resource usage may be required.

In an example, converged charging may be a process where online and offline charging may be combined.

Figure 11:
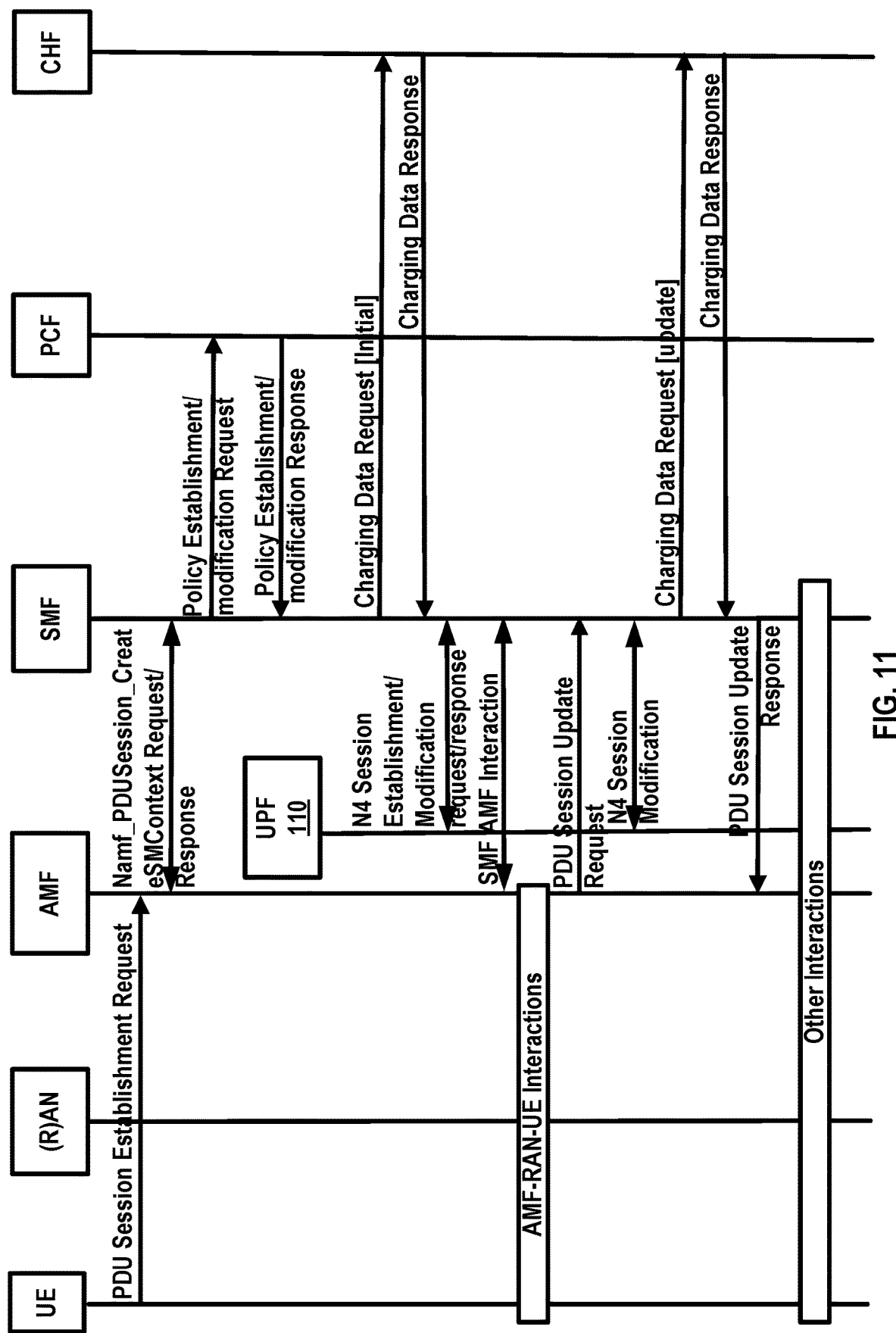
FIG. 11 is an example call flow for PDU session establishment charging as per an aspect of an embodiment of the present disclosure.

FIG. 11 is an example call flow for PDU session establishment charging as per an aspect of an embodiment of the present disclosure.

In an example, a UE may initiate a PDU Session establishment procedure by sending a PDU Session Establishment Request message to an AMF. The PDU Session Establishment Request message may comprise one or more of: PDU session ID, PDU Type, SSC mode, User location information, and Access Technology Type Information.

In response to the message received from the UE, an AMF may select an SMF and send to the selected SMF a message (e.g. Namf_PDUSession_CreateSMContext Request). The message sent to the SMF may be used by the AMF to request establishing the PDU session. In response to receiving the message from the AMF, the SMF may send a response message (e.g. Namf_PDUSession_CreateSMContext Response) to the AMF to indicate whether the request from the AMF is accepted or not.

In an example, the SMF may select a PCF and send to the PCF a message (e.g. SM Policy Association Establishment Request) to request PCC rules. The PCF may provide PCC rules in a response message (e.g. SM Policy Association Establishment response) to the SMF.

In an example, the SMF may create a Charging Id for the PDU session and may send a Charging Data Request [initial] message to a CHF to verify authorization of a subscriber of the UE to start the PDU session which is triggered by start of PDU session charging event.

In an example, the CHF may open a charging data record (CDR) for the PDU session and may acknowledge the Charging Data Request message by sending Charging Data Response to the SMF.

In an example, the SMF selects a UPF and may initiate an N4 Session Establishment/Modification procedure with the selected UPF.

The SMF may interact with the AMF. For example, the SMF may send to the AMF a Namf_Communication_N1N2MessageTransfer message comprising one or more of: PDU session ID, QoS Profile(s), CN Tunnel Info, and S-NSSAI from the Allowed NSSAI. This SMF/AMF interaction is labeled in FIG. 11 as SMF AMF Interaction.

In an example, the AMF may interact with the (R)AN and the UE. This interaction is labeled in FIG. 11 as AMF-RAN-UE Interactions. As part of the AMF-RAN-UE Interactions, the AMF may interact with the (R)AN and the UE by sending to the (R)AN a N2 PDU Session Request message comprising the information received from the SMF that indicates the PDU session establishment is accepted.

In an example, and as further part of the AMF-RAN-UE Interactions, the (R)AN may send to the AMF a N2 PDU Session Response message comprising one or more of: PDU session ID, N2 SM information (PDU session ID, AN Tunnel Info, List of accepted/rejected QFI(s)), wherein the AN Tunnel Info may correspond to the Access Network address of the N3 tunnel corresponding to the PDU Session.

In an example, the AMF may send to the SMF a PDU Session Update Request message (e.g. Nsmf_PDUSession_UpdateSMContext Request message) comprising the N2 SM information received from the (R)AN to the SMF.

In an example, the SMF may initiate an N4 Session Modification procedure with the UPF. As part of the N4 Session Modification procedure, the SMF may provide AN Tunnel Info to the UPF as well as the corresponding forwarding rules, and the UPF may send to the SMF a response message.

In an example, the SMF may request quota from CHF, e.g. "start of service data flow" event may need quota from CHF. The SMF may send a message to the CHF (e.g. Charging Data Request [update]). In an example, for online charging or converged charging, the SMF may request quota from CHF when allocated quota is consumed or a trigger is met to request a quota.

In an example, the UPF may report resource usage of a PDU session to the SMF. In an example, the UPF may report resource usage of a wireless device to the SMF. by enforcing the charging control rules, the SMF may send to the CHF a message (e.g. Charging Data Request [update]) comprising resource usage information received from the UPF.

In an example, the CHF may update CDR for this PDU session. The CHF may acknowledge the SMF by sending a Charging Data Response message.

In an example, the SMF may send to the AMF a Nsmf_PDUSession_UpdateSMContext Response message.

In an example, other interactions may be performed between SMF, AMF, (R)AN and UE for the PDU session establishment procedure, this interaction is labeled in FIG. 11 as Other Interactions.

In an example, 5GC may be able to provide policy information from a PCF to a UE, and such policy information may include Access Network Discovery & Selection Policy (ANDSP) and/or UE Route Selection Policy (URSP).

In an example, the ANDSP is used by the UE for selecting non-3GPP accesses and for selection of the N3IWF in a PLMN. In an example, the URSP is used by the UE to determine if a detected application may be associated to an established PDU Session, may be offloaded to non-3GPP access outside a PDU Session, or may trigger the establishment of a new PDU Session. In an example, the URSP rules may include traffic descriptors that specify the matching criteria and one or more of the following components: SSC Mode Selection Policy (SSCMSP), Network Slice Selection Policy (NSSP), DNN Selection Policy, PDU Session Type Policy, Non-seamless Offload Policy, and/or Access Type preference. In an example, the SSCMSP is used by the UE to associate the matching application with SSC modes. In an example, the NSSP is used by the UE to associate the matching application with S-NSSAI. In an example, the DNN Selection Policy is used by the UE to associate the matching application with DNN. In an example, the PDU Session Type Policy is used by the UE to associate the matching application with a PDU Session Type. In an example, the Non-seamless Offload Policy is used by the UE to determine that the matching application should be non-seamlessly offloaded to non-3GPP access (i.e. outside of a PDU Session). In an example, the Access Type preference may indicate the preferred Access Type (3GPP or non-3GPP) If the UE needs to establish a PDU Session for the matching application, this. In an example, the ANDSP and URSP may be pre-configured in the UE or may be provisioned to UE from PCF. The pre-configured policy may be applied by the UE when it has not received the same type of policy from PCF. In an example, the PCF may select the ANDSP and URSP applicable for a UE based on local configuration, Subscribed S-NSSAIs and operator policies taking into consideration e.g. accumulated usage, load level information per network slice instance, UE location. In an example, in the case of a roaming UE, the V-PCF may retrieve ANDSP and URSP from the H-PCF over N24/Npcf. When the UE is roaming and the UE has valid rules from both HPLMN and VPLMN the UE may give priority to the valid ANDSP rules from the VPLMN.

In an example, the ANDSP and URSP may be provided from the PCF to an AMF via N15/Namf interface and then from AMF to the UE via the N1 interface. The AMF may not change the ANDSP and the URSP provided by PCF.

In an example, the PCF may be responsible for delivery of UE policy. If the PCF is notified UE Policy delivery failure (e.g. because of UE unreachable), the PCF may subscribe the "Connectivity state changes (IDLE or CONNECTED)" event. After reception of the Notify message indicating that the UE enters the CM-Connected state, the PCF may retry to deliver the UE Policy.

In an example, a 5G core network may support collection of charging information for a 5G LAN-type service based on resource usage (e.g., licensed or unlicensed spectrum, QoS, applications).

In an example, a 5G core network may support collection of charging information for a 5G LAN-type service when a UE joins or leaves a specific private communication.

In an example, a 5G core network may support collection of charging information for a 5G LAN-type service for both home and roaming UEs based on the UE's HPLMN.

In an example, a non-public network may be uniquely identified by the combination of a PLMN ID and a non-public network ID. In an example, a non-public network may be isolated from a PLMN (e.g. standalone non-public network), in this case a reserved dedicated PLMN ID which is assigned globally (e.g., MCC=999 and MNC=3GPP specified value) or within a country (e.g., special MCC and MNC values specified by a local regulatory) may be used. In an example, a non-public network may be deployed as part of a PLMN, the PLMN ID of the PLMN operator may be used. FIG. 12A is an example diagram depicting a non-public network may be deployed as part of a PLMN and FIG. 12B is an example diagram depicting a non-public network may be isolated from a PLMN.

Figure 13B:
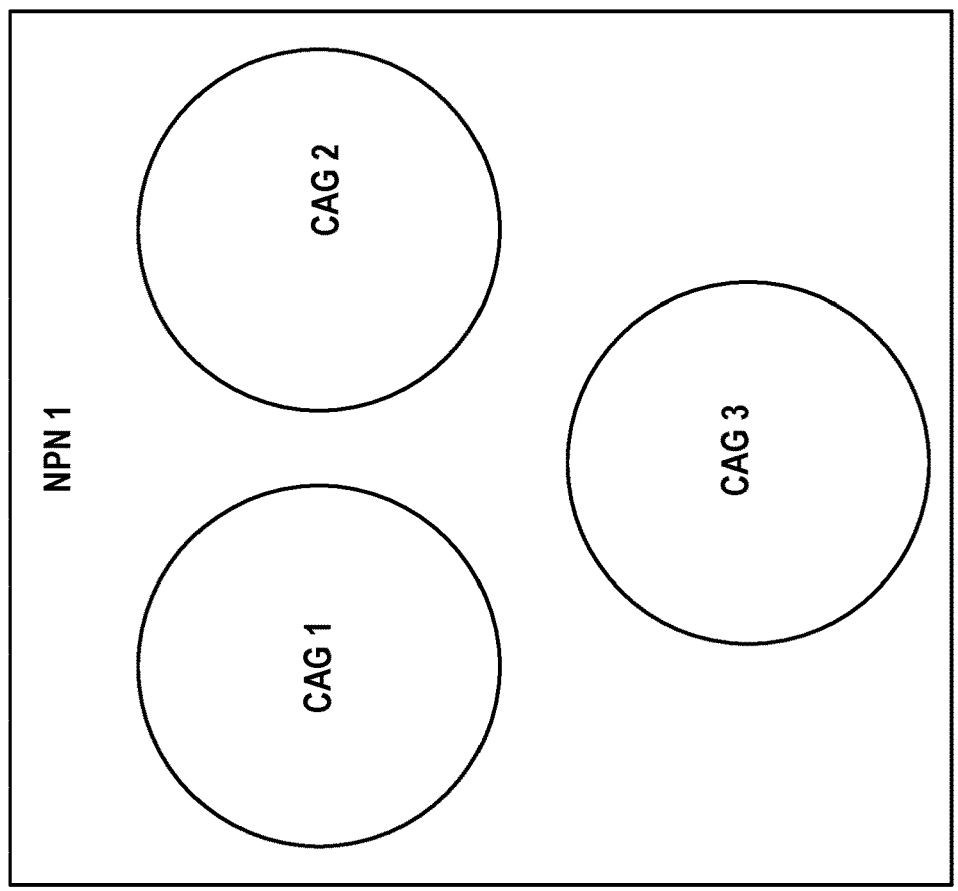
FIG. 13B is an example diagram depicting a non-public network may comprise more than one CAGs as per an aspect of an embodiment of the present disclosure.
Figure 13A:
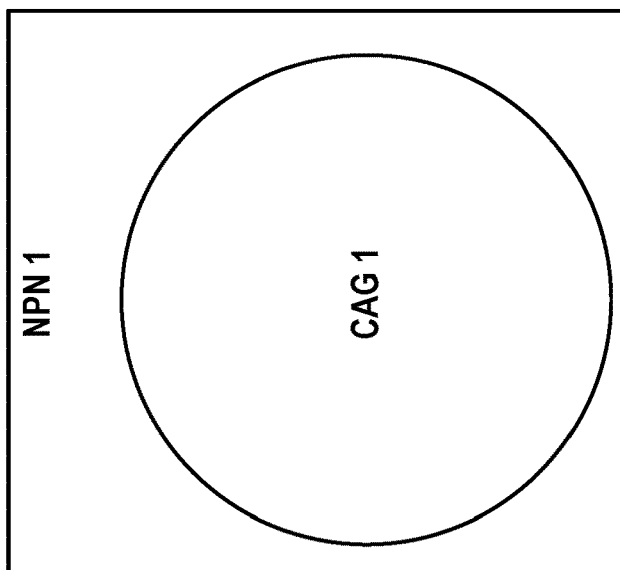
FIG. 13A is an example diagram depicting a non-public network may comprise only one CAG.

In an example, a non-public network may comprise only one CAG (e.g. an NPN ID maps to a CAG ID). In an example, a non-public network may comprise more than one CAGs (e.g. am NPN ID maps to more than one CAG IDs). FIG. 13A is an example diagram depicting a non-public network may comprise only one CAG and FIG. 13B is an example diagram depicting a non-public network may comprise more than one CAGs.

In an example, a non-public network ID (NPN-ID) identifies a non-public network. The NPN-ID may support two assignment models. A human-readable network name may identify a non-public network. The human-readable name may be unique. In an example, PLMN ID consisting of MCC 999 (assigned by ITU for private networks) and an MNC defined by 3GPP may identify a cell as part of a non-public network.

In an example, a Closed Access Group (CAG) ID uniquely identifies a closed access group (CAG) in a PLMN. In an example, a human-readable network name identifies the CAG. The human-readable name may be unique. In an example, the following information may be broadcasted in SIB for a PLMN that supports a CAG: CAG indication identifying the cell as a Closed Access Group cell; cellReservedForOtherUse indication (to prevent non-supporting UEs from accessing the cell), UEs that support non-public networks consider a cell that broadcasts both the cellReservedForOtherUse and the CAG indication as not barred; CAG ID; Optional, Human-readable network name.

In an example, UE may maintain a white list of CAG IDs. In an example, UE configured to only access CAG cells may not be allowed to register via non-CAG cells of any PLMN. In an example, UE may only automatically select and attempt to register via a CAG cell whose identity is contained in the white list. In an example, for manual CAG selection the UE may present the list of available CAG IDs and related human-readable names (if available). If a UE has successfully registered to a CAG which was not listed in the white list yet, the CAG ID may be added to the CAG white list.

In an example, subscription may contain the list of CAGs the UE is entitled to access. In an example, subscription may contain an indication whether the UE is only allowed to access CAG cells (UE is also configured accordingly), this is to address factory devices that are supposed to remain on the CAG cells.

Figure 14:
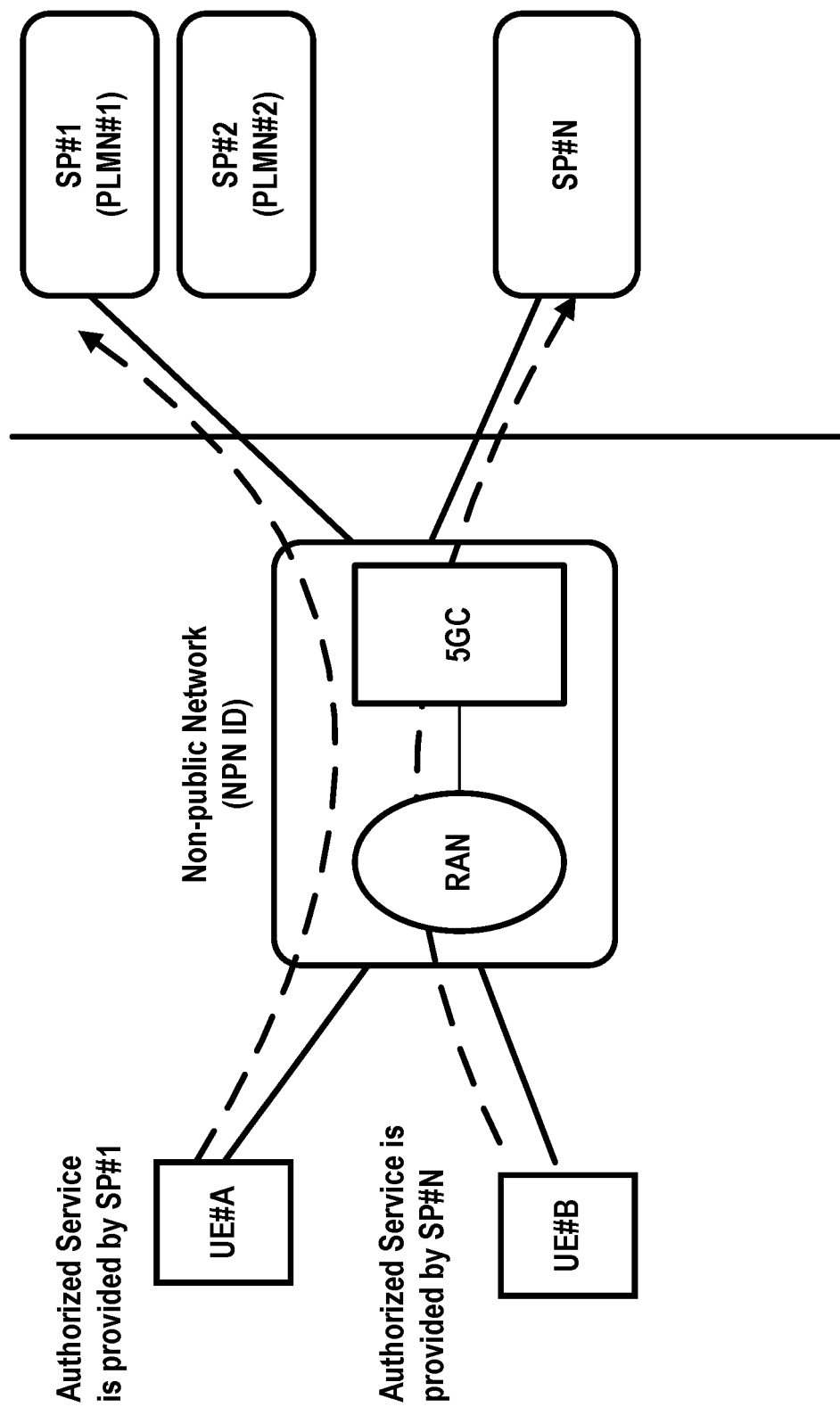
FIG. 14 is an example diagram depicting UEs access different service provider PLMNs via a non-public network as per an aspect of an embodiment of the present disclosure.

FIG. 14 is an example diagram depicting UEs accessing different service provider PLMNs via a non-public network as per an aspect of an embodiment of the present disclosure. In an example, a network may be identified with a non-public network identifier (NPN ID) advertised in the broadcast channels of a non-public network cell. A non-public network may support services provided by one or more Service Providers (SP), which can include MNOs, or 3rd party service provider. As shown in FIG. 14, UE #A and UE #B may be registered to the non-public network (NPN) identified by a Non-public network ID (NPN-ID). Service provider 1 represented by SP #1, which may be a PLMN, provides the authorized service for UE #A. The service provider represented by SP #N, which may be a $3^{rd}$ party service provider, provides an authorized service for UE #B. In an example, a UE may have a subscription with one or multiple Service Providers, each of which may be identified with an SP ID. For a UE that has a subscription with a service provider that is a PLMN, the UE's subscription data and authentication credentials may be stored at the UDM/AUSF of the service provider. The network identification of non-public network may be given by NPN ID.

In an example, the SP-ID which is the identifier for the service provider, may be advertised by the non-public network cell in the system information. A given non-public network identified by NPN ID may support multiple SP-ID. For a service provider that is a PLMN, the SP-ID may be PLMN-ID. For a service provider that is not a PLMN, SP-ID may be the domain name, and selection procedure may be based on domain name. In an example, the UE may have a subscription with one or more service providers. In an example, the RAN node in the non-public network may broadcast a non-public network indicator, and the indicator may be for example: a new non-public network indicator; or PLMN-MCC=999 to inhibit 'public UEs' to access the non-public network; or cellReservedForOtherUse indication: existing bit in SIB. In an example, the RAN node in the non-public network may broadcast an NPN-ID. In an example, the RAN node in the non-public network may broadcast a supported SP-IDs list. In an example, the UE may be configured with at least one SP-ID for the service provider that owns the UE subscription. In an example, the UE may be configured with NPN ID or a list of NPN-IDs for the NPNs that can provide the UE with the access to the SP that owns the UE subscription. In an example, the UE may be configured with authentication parameters including credentials and/or an authentication method of the configured SP-ID.

The operator may have a requirement that charging for a public network be different from charging for a non-public network (e.g. a private network for vertical industry and/or enterprise). If the same charging control rules are applied to various types of UEs, for example, a first type of UE employing CAG and a second type of UE that employs a different type of CAG or does not employ CAG, then operators may not be able to charge UE-specific rates. Existing technologies may have issues supporting charging control for NPNs and/or CAGs and/or implementing quota control for NPNs and/or CAGs. For example, PCFs using existing technologies may have difficulty determining a charging control rule for NPNs and/or CAGs. Similarly, SMFs using existing technologies may have difficulty determining a charging control rule for NPNs and/or CAGs. SMFs using existing technologies may also have difficulty mapping a charging control rule to a user plane rule for NPNs and/or CAGs.

Embodiments of the present disclosure provide enhanced mechanisms to implement charging control for an NPN and/or a CAG. Embodiments of the present disclosure provide enhanced mechanisms such that a PCF may determine a charging control rule based on an NPN and/or a CAG of a particular UE. Embodiments of the present disclosure provide enhanced mechanisms such that an SMF may determine a charging control rule based on an NPN and/or a CAG of a particular UE. Embodiments of the present disclosure provide enhanced mechanisms such that an SMF may map a charging control rule to a user plane rule for an NPN and/or a CAG of a particular UE. Embodiments of the present disclosure provide enhanced mechanisms such that a CHF may determine quota information for an NPN and/or a CAG and send the quota information to an SMF for enforcement. These enhanced mechanisms may provide efficient solutions to support charging control for an NPN and/or a CAG, and these enhanced mechanisms may meet the operator requirement that the charging for public network and non-public network are different (e.g., a different charging rate).

Figure 15:
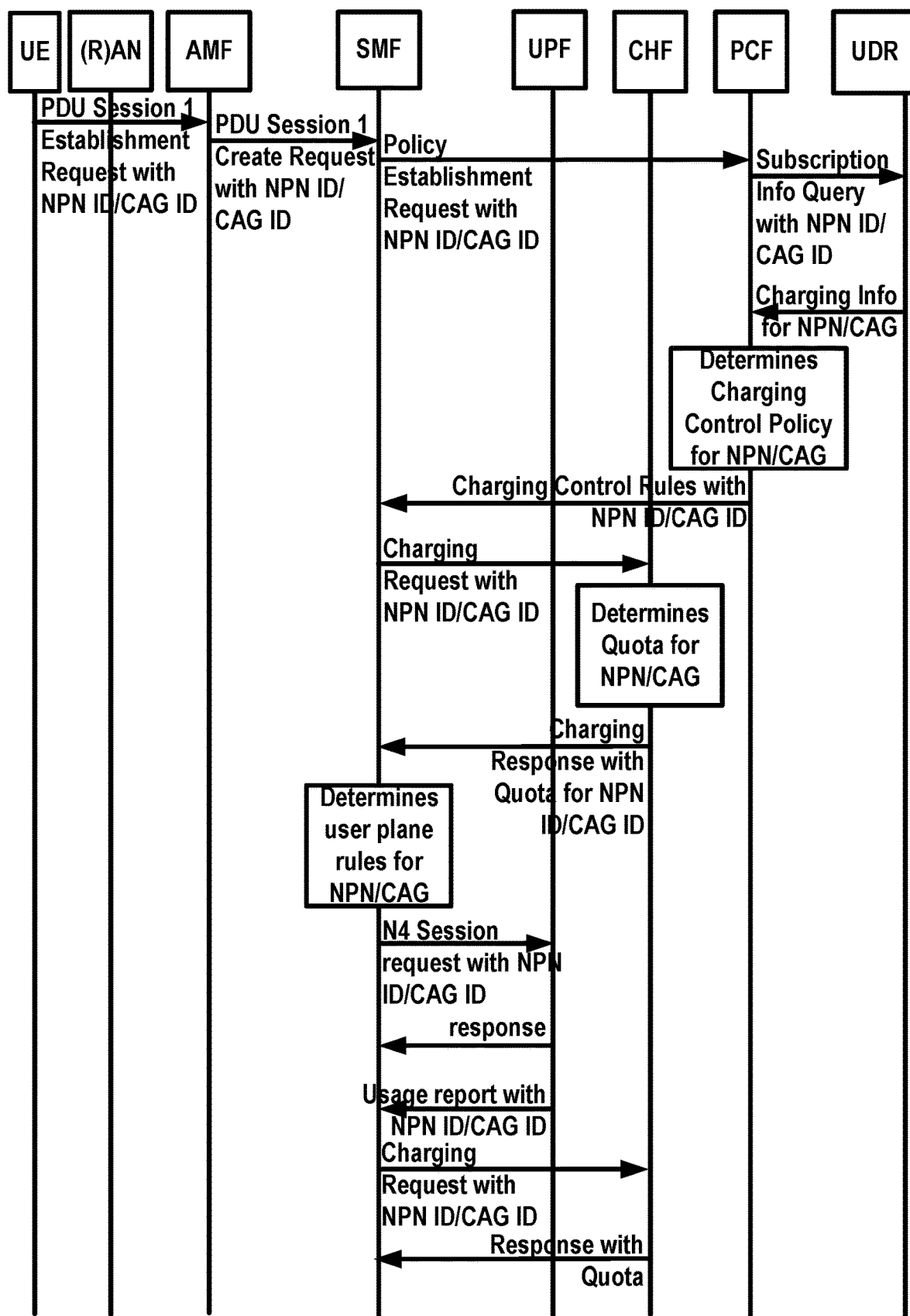
FIG. 15 is an example call flow as per an aspect of an embodiment of the present disclosure.

FIG. 15 shows example call flows which may comprise one or more actions. A UE may determine to initiate a PDU session and send to an AMF a NAS message comprising at least one of: S-NSSAI(s) and/or the NSI ID(s) of the S-NSSAI(s), a DNN, a PDU session ID, Request type, or N1 SM container (PDU session establishment request). The UE may initiate a UE requested PDU session establishment procedure by transmitting a PDU session establishment request message within the N1 SM container of the NAS message. The PDU session establishment request message may comprise at least one of: the PDU session ID, Requested PDU Session Type, or a Requested SSC mode, etc. In an example, the NAS message may comprise an NPN ID and/or CAG ID(s). In an example, the PDU session establishment request message may comprise the NPN ID and/or CAG ID(s). The NPN ID and/or CAG ID(s) may be applied for the PDU session and/or for the UE and/or for network slice (e.g. the S-NSSAI(s) and/or the NSI ID(s) of the S-NSSAI(s)) and/or the DNN. In an example, the UE may transmit the NAS message via a RAN node (e.g. gNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the NAS message.

In response to the NAS message received from the UE, the AMF may select an SMF and send to the selected SMF a message (e.g. PDUSession_CreateSMContext Request) comprising at least one of: SUPI, the DNN, the S-NSSAI(s) and/or the NSI ID(s) of the S-NSSAI(s), the PDU session ID, AMF ID, Request Type, Priority Access, N1 SM container (PDU Session Establishment Request), User location information, Access Type, PEI). The message sent to the SMF may be used by the AMF to request establishing the PDU session. In response to the PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)).

The SMF may take one or more actions. In an example action, if PCC is deployed, the SMF may send to a PCF a message (e.g. policy establishment request) comprising at least one of: the NPN ID and/or CAG ID(s), at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4 v6, Ethernet, Unstructured); Access Type (e.g. 3GPP access); RAT Type (e.g. 3GPP-NR-FDD); a PLMN identifier; an application identifier; an allocated application instance identifier; the DNN, the S-NSSAI(s) and/or the NSI ID(s) of the S-NSSAI(s), the PDU session ID, user location information, or information of the SMF for the PDU session (e.g. SMF identifier, IP address or FQDN of the SMF).

In response to the policy establishment request message received from the SMF, the PCF may send to a UDR a message (e.g. subscription retrieval request) requesting user subscription information. The subscription retrieval request message sent to the UDR may comprise at least one of: the NPN ID and/or CAG ID(s), the at least one UE identity (e.g. SUPI, PEI, and/or GPSI), the at least one UE IP address (e.g. UE IPv4 address and/or UE IPv6 network prefix), Default 5QI and default ARP, Type of PDU Session (e.g. IPv4, IPv6, IPv4 v6, Ethernet, Unstructured); Access Type (e.g. 3GPP access); RAT Type (e.g. 3GPP-NR-FDD); the PLMN identifier; the application identifier; the allocated application instance identifier; the DNN, the S-NSSAI(s) and/or the NSI ID(s) of the S-NSSAI(s), the PDU session ID, user location information, or information of the SMF for the PDU session (e.g. SMF identifier, IP address or FQDN of the SMF).

In response to the subscription retrieval request message received from the PCF, the UDR may take one or more actions. In an example action, the UDR may determine that a charging control information for NPN and/or CAG(s) is applied to a wireless device and/or network slice(s) and/or a PDU session, wherein the wireless device may be identified by the at least one UE identity, the NPN may be identified by the NPN ID, the CAG(s) may be identified by the CAG ID(s), and the network slice(s) may be identified by the S-NSSAI(s) and/or the NSI ID(s) of the S-NSSAI(s), and the PDU session may be identified by the PDU session ID. In an example, the UDR may determine the charging control information for the NPN and/or CAG(s) based on the operator policy, the local policy and/or the configuration. In an example, the user subscription information may comprise an indication that the charging control is applied to the NPN and/or CAG(s) for the wireless device. In an example, the user subscription information may comprise at least one of: a charging rate for an NPN and/or CAG(s), a charging method (e.g. offline charging, online charging, or converged charging) for the NPN and/or CAG(s), or an address of a charging function for the NPN and/or CAG(s). In an example, the UDR may determine the charging control information based on the user subscription information. In an example, the charging control information may comprise at least one of: a charging rate, a charging method, or an address of a charging function. The charging method may comprise at least one of: offline charging, online charging, or converged charging. In an example action, the UDR may send to the PCF a response message (e.g. subscription retrieval response) comprising at least one of: the charging control information for the NPN and/or CAG(s); the NPN ID and/or CAG ID(s).

In response to the subscription retrieval response message received from the UDR, the PCF may take one or more actions. In an example action, the PCF may determine charging control policy for the NPN and/or CAG(s). The PCF may determine a charging control rule for the NPN ID and/or CAG ID(s) based on the information received from the UDR (e.g. charging control information) and/or the information received from the SMF (e.g. the NPN ID and/or CAG ID(s)) and/or the operator local policy. The charging control rule may comprise at least one of: a charging rate, a charging method, or an address of a charging function. The charging method may comprise at least one of: offline charging, online charging, or converged charging. In an example, the PCF may determine a charging rate (e.g. a flat rate) for the NPN and/or CAG(s) based on the charging control information received from the UDR and/or operator local policy. In an example, the PCF may determine a charging method (e.g. offline charging) for the NPN and/or CAG(s) based on the charging control information received from the UDR and/or local operator policy. In an example, the PCF may select a CHF (e.g. a specific CHF for an NPN and/or a CAG) for the NPN and/or CAG(s) based on the charging control information received from the UDR and/or local operator policy. In an example, the charging control rule determined by the PCF may be applied to the PDU session, a network slice (e.g. the S-NSSAI and/or the NSI ID of the S-NSSAI), a QoS flow and/or a service data flow for the NPN and/or CAG(s).

In an example action, the PCF may send to the SMF a message (e.g. policy establishment response) comprising at least one of: the charging control rules for the NPN and/or CAG; the NPN ID and/or CAG ID(s); the PDU session ID; the S-NSSAI and/or the NSI ID of the S-NSSAI.

In response to the policy establishment response message received from the PCF, the SMF may take one or more actions. In an example action, the SMF may send to the CHF a message (e.g. a charging data request) comprising at least one of: the NPN ID and/or CAG ID(s) for the PDU session and/or the UE; the PDU session ID; the at least one UE identity; or the S-NSSAI and/or the NSI ID of the S-NSSAI.

In response to the charging data request message, the CHF may determine a quota for the NPN and/or CAG(s) based on the information received from the SMF (e.g. the NPN ID and/or CAG ID(s)). In an example, the quota may comprise at least one of: a granted unit; a time quota threshold; or a volume quota threshold. In an example, the CHF may determine a higher granted unit for an NPN and/or a CAG. The CHF may send to the SMF a response message (e.g. charging data response) comprising the quota and/or the NPN ID and/or CAG ID(s).

In response to the charging data response, the SMF may take one or more actions. In an example action, the SMF may enforce the quota. In an example action, the SMF may enforce the charging control rule. In an example action, the SMF may select a UPF for the NPN and/or CAG(s) based on the NPN ID and/or CAG ID(s). In an example action, the SMF may select a UPF for the NPN and/or CAG(s) based on the quota and/or the charging control rule. In an example action, the SMF may determine at least one of the following user plane rules for the PDU session and/or the NPN and/or CAG(s) based on the quota and/or the charging control rule: at least one packet detection rule; at least one forwarding action rule; at least one QoS enforcement rule; or at least one usage reporting rule. In an example, the SMF may map the charging control rule to the user plane rules for the NPN and/or CAG(s). In an example action, the SMF may send to the UPF a message comprising the at least one user plane rules and/or the NPN ID and/or CAG ID(s).

In response to the message received from the SMF, the UPF may install the user plane rules, send to the SMF a response message (e.g. N4 session establishment/modification response), and enforce the user plane rules received from the SMF.

In an example, the UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule.

In an example, the UPF may enforce the at least one forwarding action rule by forwarding, duplicating, dropping or buffering a data/traffic packet respectively. In an example, the UPF may redirect the traffic to a web portal of the operator.

In an example, the UPF may enforce the at least one QoS enforcement rule by applying at least one of QoS parameters: 5QI, ARP, MBR, GBR to a service data flow; In an example, the UPF may enforce the at least one QoS enforcement rule by applying at least one of QoS parameters: Session AMBR and default 5QI/ARP combination to a PDU session.

In an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met.

In an example, the network resources usage reported to the SMF by the UPF may comprise traffic data volume, duration (i.e. time) applied to at least one of: the NPN ID and/or CAG ID(s), the UE, the PDU session, a QoS flow, a service data flow, an application, a network slice, or a data network.

Figure 16:
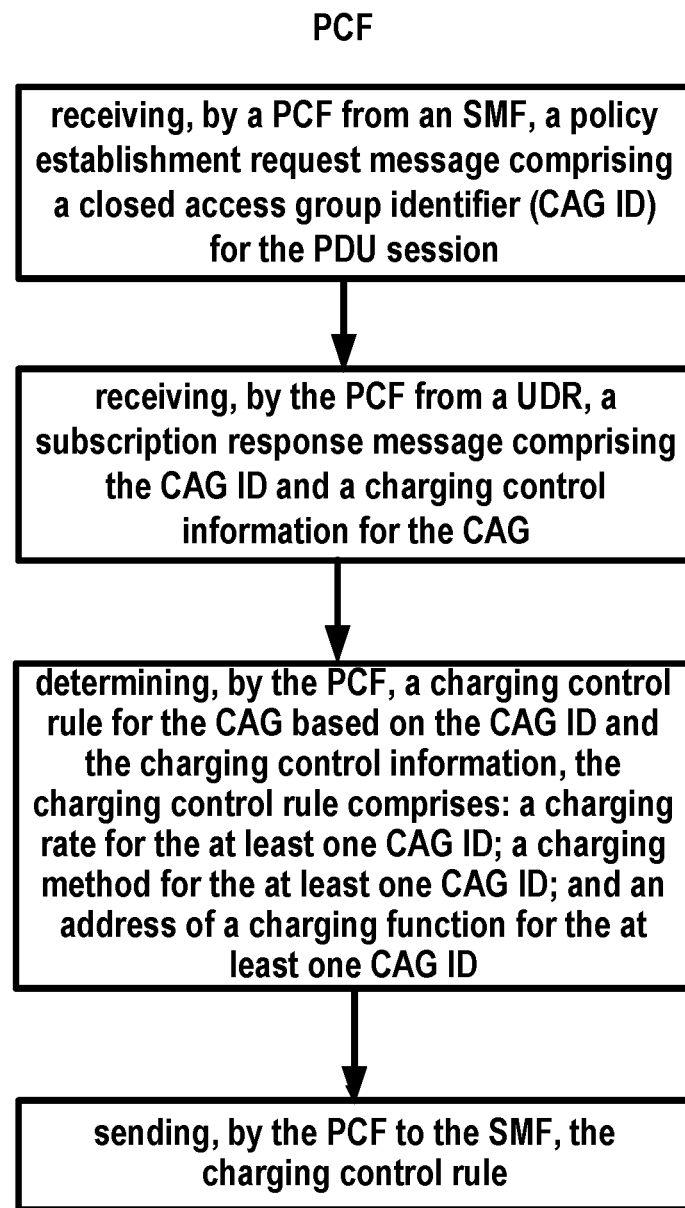
FIG. 16 is an example diagram depicting the procedures of PCF as per an aspect of an embodiment of the present disclosure.
Figure 17:
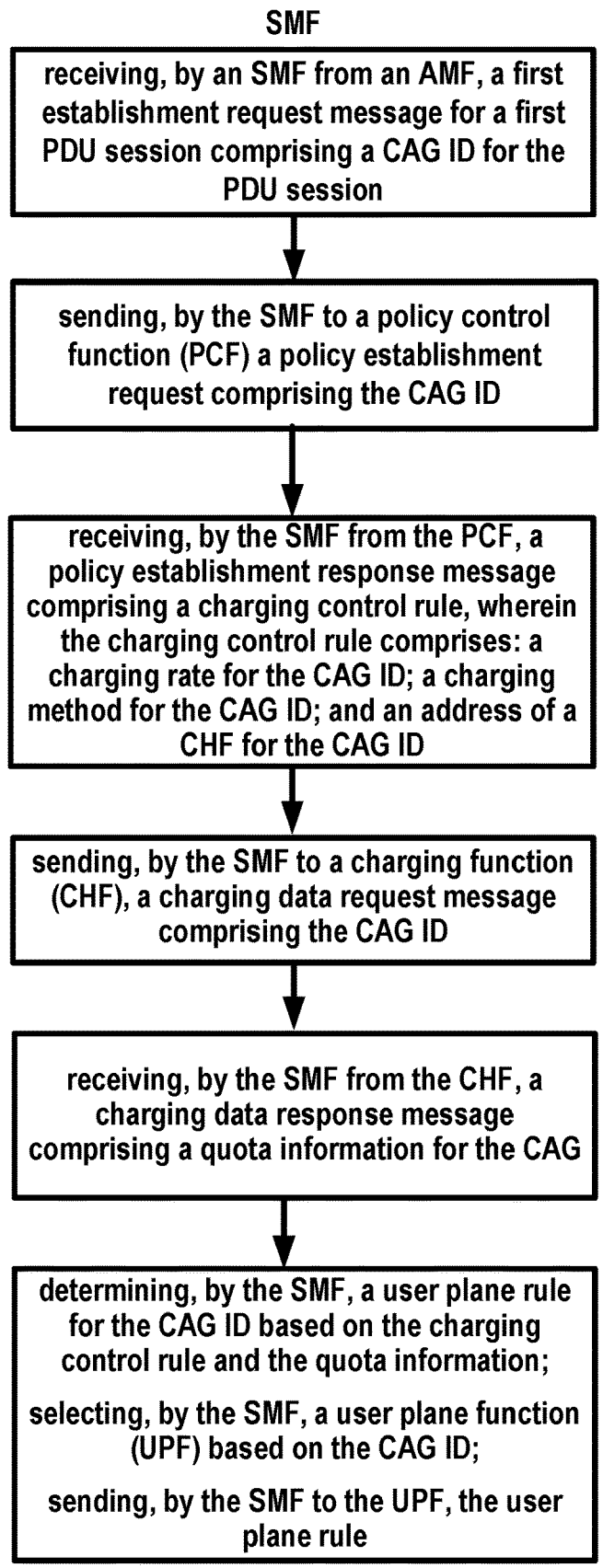
FIG. 17 is an example diagram depicting the procedures of SMF as per an aspect of an embodiment of the present disclosure.

The SMF may map the received network resources usage to the NPN ID and/or CAG ID(s) and/or PDU session and/or network slice and/or the UE. The SMF may send to the CHF a message (e.g. charging data request [update]) comprising the network resources usage and/or the NPN ID and/or CAG ID(s). The CHF may determine/update a new quota and send the new quota to the SMF in a response message (e.g. charging data response [update]). FIG. 16 is an example diagram depicting the procedures of PCF as per an aspect of an embodiment of the present disclosure. FIG. 17 is an example diagram depicting the procedures of SMF as per an aspect of an embodiment of the present disclosure.

Figure 18:
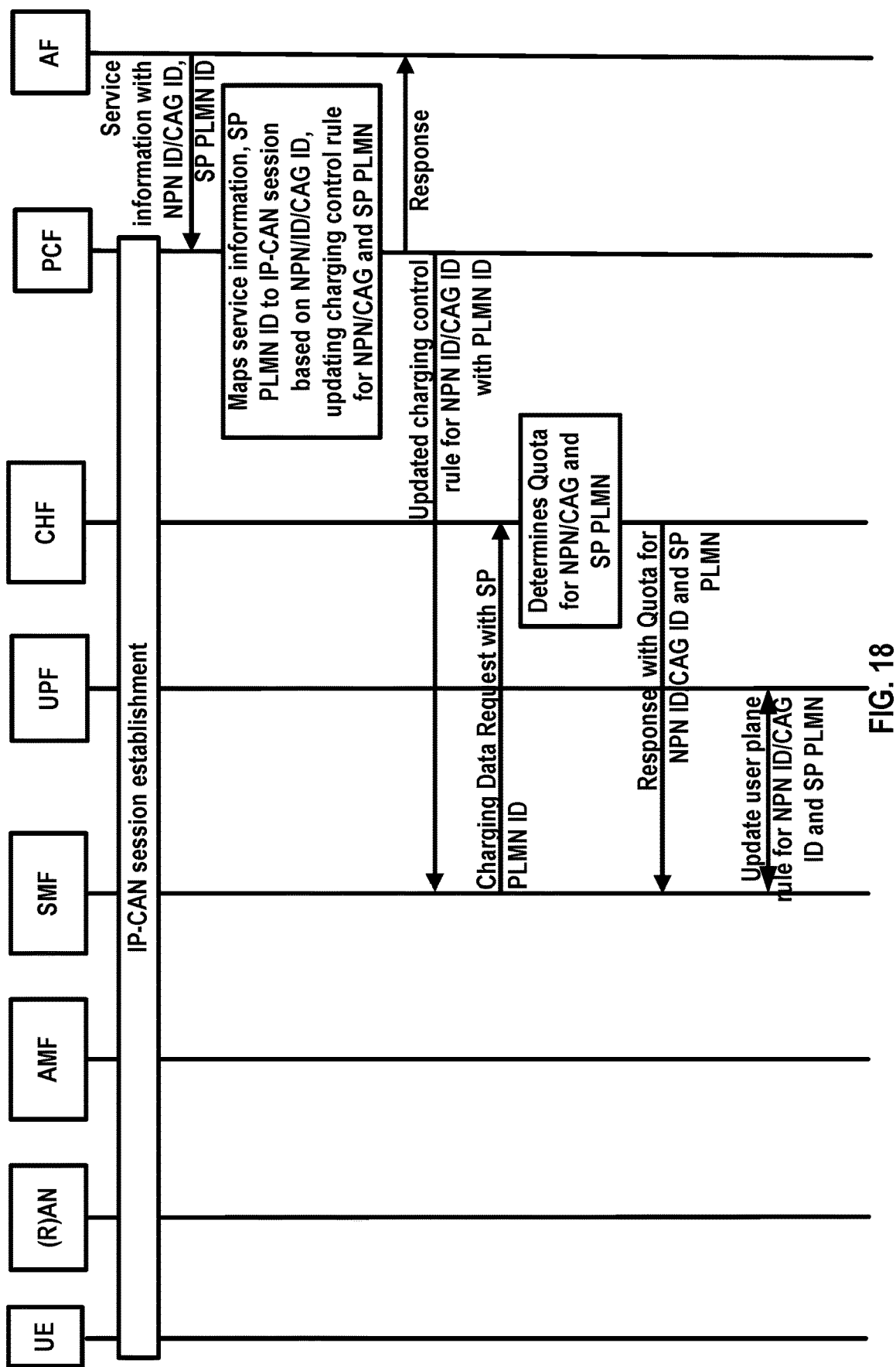
FIG. 18 is an example call flow as per an aspect of an embodiment of the present disclosure.

FIG. 18 shows example call flows which may comprise one or more actions. A UE may have already established a PDU session via base station, AMF, SMF, PCF, and/or UPF. The UE may send to an AF an NPN ID and/or CAG ID(s) via application signaling message (e.g. SIP/SDP). The AF may send to a PCF a message (e.g. application/service information provision) providing application/service information to the PCF. The application/service information provision message may be sent to the PCF via a NEF. The application/service information provision message may comprise at least one of: the NPN ID and/or CAG ID(s), a service provider public land mobile network identifier (SP PLMN ID); at least one UE IP address (e.g. UE IPv4 address and/or UE IPv6 network prefix), at least one UE identity (e.g. SUPI, PEI, and/or GPSI), a DNN, or application/service information. The application/service information may comprise one or more of the following information elements: IP filter information to identify a service data flow of the application service, an application identifier, a media/application/service type, and requested media/application/service QoS (e.g. 5QI, ARP, and/or bandwidth).

In response to the application/service information provision message received from the AF, the PCF may take one or more actions. In an example action, the PCF may map the SP PLMN ID and/or the NPN ID and/or CAG ID(s) and/or the application/service information to a PDU session and/or network slice(s) for a wireless device based on the at least one UE IP address and/or the DNN and/or the NPN ID and/or CAG ID(s), e.g. the at least one UE IP address and/or the DNN and/or the NPN ID and/or CAG ID(s) received from the AF is(are) the same as the one(s) received from the SMF. In an example, the PCF may map the SP PLMN ID and/or the NPN ID and/or CAG ID(s) and/or the application/ service information to the PDU session and/or S-NSSAI and/or NSI ID of the S-NSSAI associated with the PDU session.

In an example action, based on the local operator policy and/or the information received from the SMF, and/or the information received from the AF, the PCF may determine/ update charging control rules for the SP PLMN and/or the NPN and/or CAG(s) applied to the PDU session and/or the network slice(s) of the UE. In an example, the PCF may determine a charging rate (e.g. a flat rate) for the SP PLMN and/or the NPN and/or CAG(s) based on the SP PLMN ID and/or the NPN ID and/or CAG ID(s) and/or information received from a UDR and/or local operator policy. In an example, the PCF may determine a charging method (e.g. converged charging) for the SP PLMN and/or the NPN and/or CAG(s) based on the SP PLMN ID and/or the NPN ID and/or CAG ID(s) and/or information received from the UDR and/or local operator policy. In an example, the PCF may select a CHF (e.g. a specific CHF for the SP PLMN and/or the NPN and/or CAG(s)) based on the SP PLMN ID and/or the NPN ID and/or CAG ID(s) and/or charging control information received from the UDR and/or local operator policy. In an example, the charging control rule determined by the PCF may be applied to the PDU session, the network slice (e.g. the S-NSSAI and/or the NSI ID of the S-NSSAI), a QoS flow and/or a service data flow for the NPN and/or CAG(s).

In an example action, the PCF may send to the SMF a message (e.g. policy association modification) comprising at least one of: the charging control rules for the SP PLMN and/or the NPN and/or CAG; the SP PLMN ID; the NPN ID and/or CAG ID(s); the PDU session ID; the S-NSSAI and/or the NSI ID of the S-NSSAI.

In response to the policy association modification message received from the PCF, the SMF may take one or more actions. In an example action, the SMF may send to the CHF a message (e.g. a charging data request) comprising at least one of: the SP PLMN ID; the NPN ID and/or CAG ID(s) for the PDU session and/or the UE; the PDU session ID; the at least one UE identity; or the S-NSSAI and/or the NSI ID of the S-NSSAI.

In response to the charging data request message, the CHF may determine a quota for the SP PLMN and/or the NPN and/or CAG(s) based on the information received from the SMF (e.g. the SP PLMN ID, the NPN ID and/or CAG ID(s)). In an example, the quota may comprise at least one of: a granted unit; a time quota threshold; or a volume quota threshold. In an example, the CHF may determine different granted unit for different SP PLMN and/or NPN and/or CAG(s). The CHF may send to the SMF a response message (e.g. charging data response) comprising the quota and/or the SP PLMN ID and/or the NPN ID and/or CAG ID(s).

In response to the charging data response, the SMF may take one or more actions. In an example action, the SMF may enforce the quota. In an example action, the SMF may enforce the charging control rule. In an example action, the SMF may reuse an existing UPF for the PDU session. In an example action, the SMF may select a new UPF for the SP PLMN and/or the NPN and/or CAG(s) based on the SP PLMN ID and/or the NPN ID and/or CAG ID(s). In an example action, the SMF may select a UPF for the SP PLMN and/or the NPN and/or CAG(s) based on the quota and/or the charging control rule. In an example action, the SMF may determine at least one of the following user plane rules for the PDU session and/or the SP PLMN and/or the NPN and/or CAG(s) based on the quota and/or the charging control rule: at least one packet detection rule; at least one forwarding action rule; at least one QoS enforcement rule; or at least one usage reporting rule. In an example, the SMF may map the charging control rule to the user plane rules for the SP PLMN and/or NPN and/or CAG(s). In an example action, the SMF may send to the UPF a message comprising the at least one user plane rules and/or the SP PLMN ID and/or the NPN ID and/or CAG ID(s).

In response to the message received from the SMF, the UPF may install the user plane rules, send to the SMF a response message (e.g. N4 session establishment/modification response), and enforce the user plane rules received from the SMF.

In an example, the UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule.

In an example, the UPF may enforce the at least one forwarding action rule by forwarding, duplicating, dropping or buffering a data/traffic packet respectively. In an example, the UPF may redirect the traffic to a web portal of the operator.

In an example, the UPF may enforce the at least one QoS enforcement rule by applying at least one of QoS parameters: 5QI, ARP, MBR, GBR to a service data flow; In an example, the UPF may enforce the at least one QoS enforcement rule by applying at least one of QoS parameters: Session AMBR and default 5QI/ARP combination to a PDU session.

In an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met.

In an example, the network resources usage reported to the SMF by the UPF may comprise traffic data volume, duration (i.e. time) applied to at least one of: the SP PLMN ID and/or the NPN ID and/or CAG ID(s), the UE, the PDU session, a service data flow, an application, a network slice, or a data network.

The SMF may map the received network resources usage to the SP PLMN ID and/or the NPN ID and/or CAG ID(s) and/or PDU session and/or network slice and/or the UE. The SMF may send to the CHF a message (e.g. charging data request [update]) comprising the network resources usage and/or the SP PLMN ID and/or the NPN ID and/or CAG ID(s). The CHF may determine/update a new quota and send the new quota to the SMF in a response message (e.g. charging data response [update]).

Figure 19:
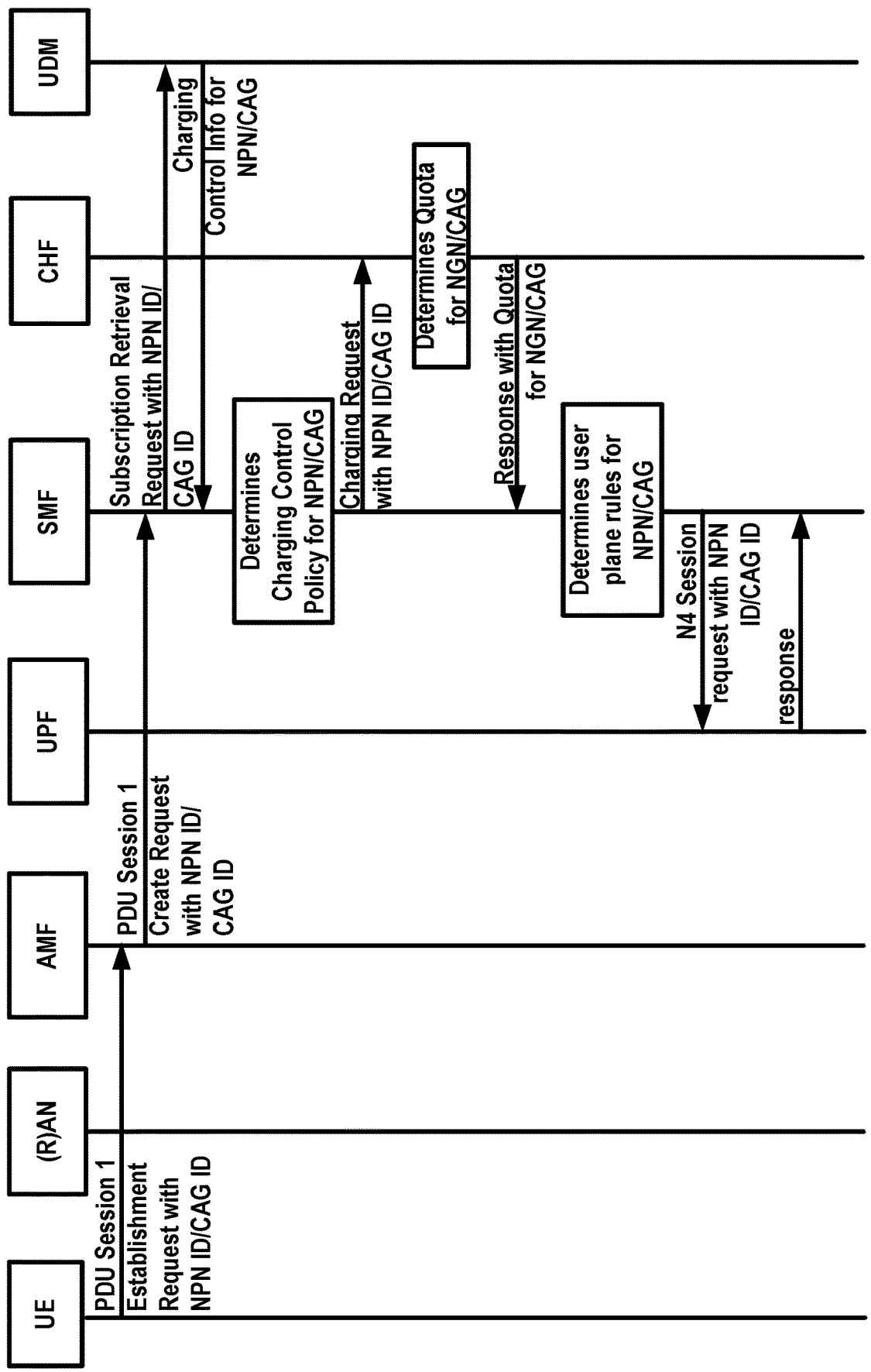
FIG. 19 is an example call flow as per an aspect of an embodiment of the present disclosure.

FIG. 19 shows example call flows which may comprise one or more actions. A UE may determine to initiate a PDU session and send to an AMF a NAS message comprising at least one of: S-NSSAI(s) and/or the NSI ID(s) of the S-NSSAI(s), a DNN, a PDU session ID, Request type, or N1 SM container (PDU session establishment request). The UE may initiate a UE requested PDU session establishment procedure by transmitting a PDU session establishment request message within the N1 SM container of the NAS message. The PDU session establishment request message may comprise at least one of: the PDU session ID, Requested PDU Session Type, or a Requested SSC mode, etc. In an example, the NAS message may comprise an NPN ID and/or CAG ID(s). In an example, the PDU session establishment request message may comprise the NPN ID and/or CAG ID(s). The NPN ID and/or CAG ID(s) may be applied for the PDU session and/or for the UE. In an example, the UE may transmit the NAS message via a RAN node (e.g. gNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the NAS message.

In response to the NAS message received from the UE, the AMF may select an SMF and send to the selected SMF a message (e.g. PDUSession_CreateSMContext Request) comprising at least one of: SUPI, the DNN, the S-NSSAI(s) and/or the NSI ID(s) of the S-NSSAI(s), the PDU session ID, AMF ID, Request Type, Priority Access, N1 SM container (PDU Session Establishment Request), User location information, Access Type, PEI). The message sent to the SMF may be used by the AMF to request establishing the PDU session. In response to the PDUSession_CreateSMContext Request message received from the AMF, the SMF may send to the AMF a response message (e.g. PDUSession_CreateSMContext Response) comprising at least one of: Cause, SM Context ID or N1 SM container (PDU Session Reject (Cause)).

The SMF may take one or more actions. In an example action, if PCC is not deployed, the SMF may send to a UDM a message (e.g. subscription retrieval request) requesting user subscription information. The subscription retrieval request message sent to the UDM may comprise at least one of: the NPN ID and/or CAG ID(s), the at least one UE identity (e.g. SUPI, PEI, and/or GPSI), the at least one UE IP address (e.g. UE IPv4 address and/or UE IPv6 network prefix), Default 5QI and default ARP, Type of PDU Session (e.g. IPv4, IPv6, IPv4 v6, Ethernet, Unstructured); Access Type (e.g. 3GPP access); RAT Type (e.g. 3GPP-NR-FDD); the PLMN identifier; the application identifier; the allocated application instance identifier; the DNN, the S-NSSAI(s) and/or the NSI ID(s) of the S-NSSAI(s), the PDU session ID, user location information, or information of the SMF for the PDU session (e.g. SMF identifier, IP address or FQDN of the SMF).

In response to the subscription retrieval request message received from the SMF, the UDM may take one or more actions. In an example action, the UDM may determine that a charging control information for NPN and/or CAG(s) is applied to a wireless device and/or network slice(s) and/or a PDU session and/or a DNN, wherein the wireless device may be identified by the at least one UE identity, the NPN may be identified by the NPN ID, the CAG(s) may be identified by the CAG ID(s), the network slice(s) may be identified by the S-NSSAI(s) and/or the NSI ID(s) of the S-NSSAI(s), the PDU session may be identified by the PDU session ID, and the data network may be identified by the DNN. In an example, the UDM may determine the charging control information for NPN and/or CAG(s) based on the operator policy, the local policy and/or the configuration. In an example, the user subscription information may comprise an indication that the charging control is applied to the NPN and/or CAG(s) for the wireless device. In an example, the user subscription information may comprise at least one of: a charging rate for an NPN and/or CAG(s), a charging method (e.g. offline charging, online charging, or converged charging) for the NPN and/or CAG(s), or an address of a charging function for the NPN and/or CAG(s). In an example, the UDM may determine the charging control information based on the user subscription information. In an example, the charging control information may comprise at least one of: a charging rate, a charging method, or an address of a charging function. The charging method may comprise at least one of: offline charging, online charging, or converged charging. In an example action, the UDM may send to the SMF a response message (e.g. subscription retrieval response) comprising at least one of: the charging control information for the NPN and/or CAG(s); the NPN ID and/or CAG ID(s).

In response to the subscription retrieval response message received from the UDM, the SMF may determine charging control policy for the NPN and CAG(s). The SMF may determine a charging control rule for the NPN ID and/or CAG ID(s) based on the information received from the UDM (e.g. charging control information) and/or the information received from the AMF (e.g. the NPN ID and/or CAG ID(s)) and/or the local operator policy. The charging control rule may comprise at least one of: a charging rate, a charging method, or an address of a charging function. The charging method may comprise at least one of: offline charging, online charging, or converged charging. In an example, the SMF may determine a charging rate (e.g. a flat rate) for the NPN and/or CAG(s) based on the charging control information received from the UDM and/or local operator policy. In an example, the SMF may determine a charging method (e.g. offline charging) for the NPN and/or CAG(s) based on the charging control information received from the UDM and/or operator local policy. In an example, the SMF may select a CHF (e.g. a specific CHF for an NPN and/or a CAG) for the NPN and/or CAG(s) based on the charging control information received from the UDM and/or operator local policy. In an example, the charging control rule determined by the SMF may be applied to the PDU session, a network slice (e.g. the S-NSSAI and/or the NSI ID of the S-NSSAI), a QoS flow and/or a service data flow for the NPN and/or CAG(s).

In an example action, the SMF may send to the CHF a message (e.g. a charging data request) comprising at least one of: the NPN ID and/or CAG ID(s) for the PDU session and/or the UE; the PDU session ID; the at least one UE identity; or the S-NSSAI and/or the NSI ID of the S-NSSAI.

In response to the charging data request message, the CHF may determine a quota for the NPN and/or CAG(s) based on the information received from the SMF (e.g. the NPN ID and/or CAG ID(s)). In an example, the quota may comprise at least one of: a granted unit; a time quota threshold; or a volume quota threshold. In an example, the CHF may determine a higher granted unit for an NPN and/or a CAG. The CHF may send to the SMF a response message (e.g. charging data response) comprising the quota and/or the NPN ID and/or CAG ID(s).

In response to the charging data response, the SMF may take one or more actions. In an example action, the SMF may enforce the quota. In an example action, the SMF may enforce the charging control rule. In an example action, the SMF may select a UPF for the NPN and/or CAG(s) based on the NPN ID and/or CAG ID(s). In an example action, the SMF may select a UPF for the NPN and/or CAG(s) based on the quota and/or the charging control rule. In an example action, the SMF may determine at least one of the following user plane rules for the PDU session and/or the NPN and/or CAG(s) based on the quota and/or the charging control rule: at least one packet detection rule; at least one forwarding action rule; at least one QoS enforcement rule; or at least one usage reporting rule. In an example, the SMF may map the charging control rule to the user plane rules for the NPN and/or CAG(s). In an example action, the SMF may send to the UPF a message comprising the at least one user plane rules and/or the NPN ID and/or CAG ID(s).

In response to the message received from the SMF, the UPF may install the user plane rules, send to the SMF a response message (e.g. N4 session establishment/modification response), and enforce the user plane rules received from the SMF.

In an example, the UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule.

In an example, the UPF may enforce the at least one forwarding action rule by forwarding, duplicating, dropping or buffering a data/traffic packet respectively. In an example, the UPF may redirect the traffic to a web portal of the operator.

In an example, the UPF may enforce the at least one QoS enforcement rule by applying at least one of QoS parameters: 5QI, ARP, MBR, GBR to a service data flow; In an example, the UPF may enforce the at least one QoS enforcement rule by applying at least one of QoS parameters: Session AMBR and default 5QI/ARP combination to a PDU session.

In an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met.

In an example, the network resources usage reported to the SMF by the UPF may comprise traffic data volume, duration (i.e. time) applied to at least one of: the SP PLMN ID and/or the NPN ID and/or CAG ID(s), the UE, the PDU session, a service data flow, an application, a network slice, or a data network.

The SMF may map the received network resources usage to the NPN ID and/or CAG ID(s) and/or PDU session and/or network slice and/or the UE. The SMF may send to the CHF a message (e.g. charging data request [update]) comprising the network resources usage of the NPN ID and/or CAG ID(s). The CHF may determine/update a new quota and send the new quota to the SMF in a response message (e.g. charging data response [update]).

Figure 20:
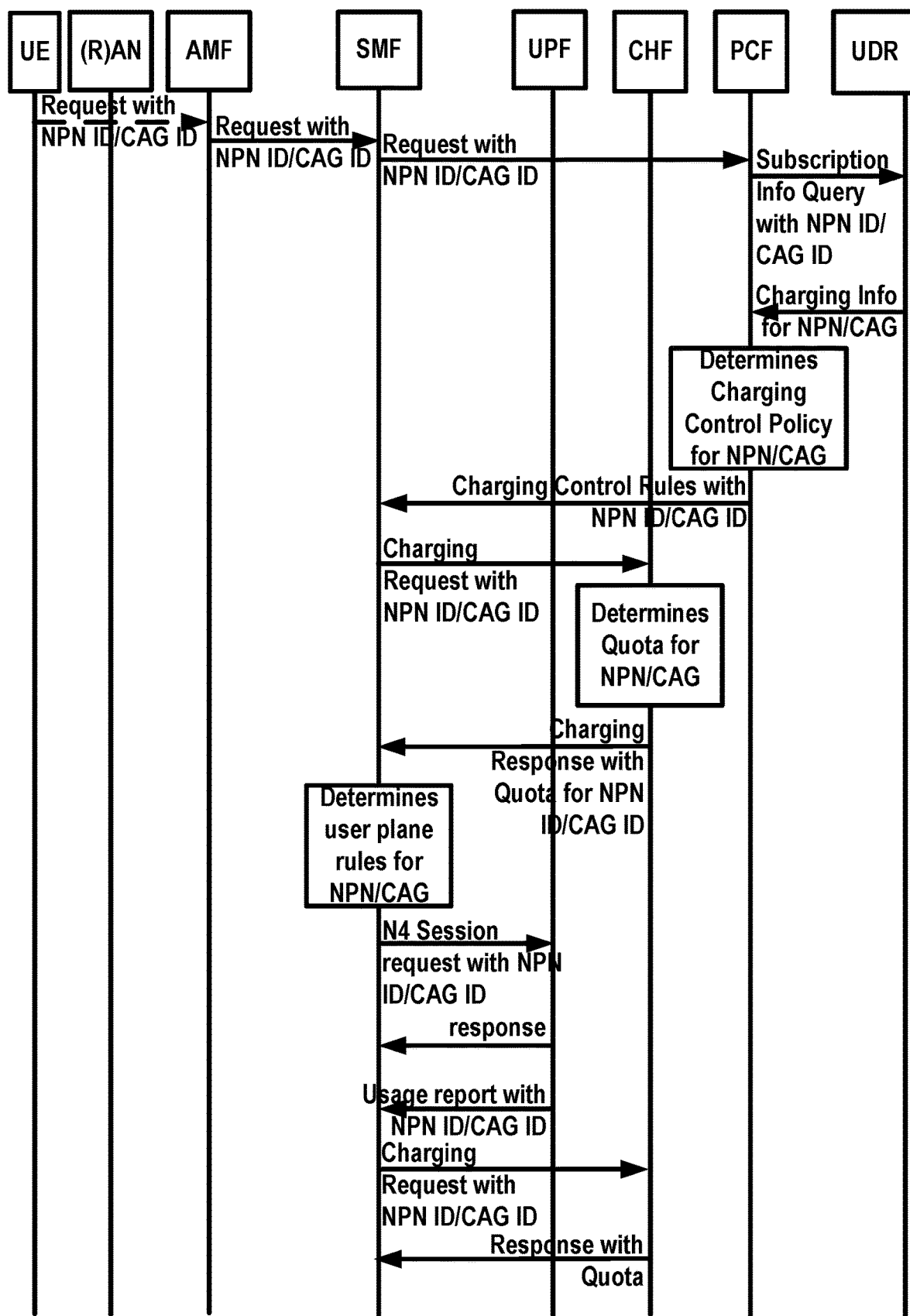
FIG. 20 is an example call flow as per an aspect of an embodiment of the present disclosure.

FIG. 20 shows example call flows which may comprise one or more actions. A UE may send to an AMF a NAS message (e.g. service request message) comprising at least one of: S-NSSAI(s) and/or the NSI ID(s) of the S-NSSAI(s), a DNN, a PDU session ID, or a Request type. In an example, the NAS message may comprise an NPN ID and/or CAG ID(s). The NPN ID and/or CAG ID(s) may be applied for the PDU session and/or for the UE and/or for network slice (e.g. the S-NSSAI(s) and/or the NSI ID(s) of the S-NSSAI(s)) and/or the DNN. In an example, the UE may transmit the NAS message via a RAN node (e.g. gNB, base station). The UE may transmit, to the RAN node, a radio resource control (RRC) message (e.g. uplink (UL) information transfer message, RRC setup complete message, RRC resume complete message, RRC reconfiguration complete message, and/or the like) comprising the NAS message. The RAN node may transmit, to the AMF, a N2 message (e.g. NG message, initial UE message, uplink NAS transport message, reroute NAS request message, handover request message, initial context setup request message, PDU session resource setup/modify response message, PDU session resource modify required message, and/or the like) comprising the NAS message.

In response to the NAS message received from the UE, the AMF may select an SMF and send to the selected SMF a message (e.g. PDUSession_UpdateSMContext Request) comprising at least one of: SUPI, the DNN, the S-NSSAI(s) and/or the NSI ID(s) of the S-NSSAI(s), the PDU session ID, AMF ID, Request Type, Priority Access, User location information, Access Type, PEI). In response to the PDUSession_UpdateSMContext Request message received from the AMF, the SMF may send to the AMF a response message (e.g. PDUSession_UpdateSMContext Response) comprising at least one of: Cause, SM Context ID or N1 SM container (PDU Session Reject (Cause)).

The SMF may take one or more actions. In an example action, if PCC is deployed, the SMF may send to a PCF a message (e.g. policy establishment/modification request) comprising at least one of: the NPN ID and/or CAG ID(s), at least one UE identity (e.g. SUPI, PEI, and/or GPSI), at least one UE IP address (e.g. UE IPv4 address and/or UE IPv6 network prefix), Default 5QI and default ARP, Type of PDU Session (e.g. IPv4, IPv6, IPv4 v6, Ethernet, Unstructured); Access Type (e.g. 3GPP access); RAT Type (e.g. 3GPP-NR-FDD); a PLMN identifier; an application identifier; an allocated application instance identifier; the DNN, the S-NSSAI(s) and/or the NSI ID(s) of the S-NSSAI(s), the PDU session ID, user location information, or information of the SMF for the PDU session (e.g. SMF identifier, IP address or FQDN of the SMF).

In response to the policy establishment/modification request message received from the SMF, the PCF may send to a UDR a message (e.g. subscription retrieval request) requesting user subscription information. The subscription retrieval request message sent to the UDR may comprise at least one of: the NPN ID and/or CAG ID(s), the at least one UE identity (e.g. SUPI, PEI, and/or GPSI), the at least one UE IP address (e.g. UE IPv4 address and/or UE IPv6 network prefix), Default 5QI and default ARP, Type of PDU Session (e.g. IPv4, IPv6, IPv4 v6, Ethernet, Unstructured); Access Type (e.g. 3GPP access); RAT Type (e.g. 3GPP-NR-FDD); the PLMN identifier; the application identifier; the allocated application instance identifier; the DNN, the S-NSSAI(s) and/or the NSI ID(s) of the S-NSSAI(s), the PDU session ID, user location information, or information of the SMF for the PDU session (e.g. SMF identifier, IP address or FQDN of the SMF).

In response to the subscription retrieval request message received from the PCF, the UDR may take one or more actions. In an example action, the UDR may determine that a charging control information for NPN and/or CAG(s) is applied to a wireless device and/or network slice(s) and/or a PDU session, wherein the wireless device may be identified by the at least one UE identity, the NPN may be identified by the NPN ID, the CAG(s) may be identified by the CAG ID(s), and the network slice(s) may be identified by the S-NSSAI(s) and/or the NSI ID(s) of the S-NSSAI(s), and the PDU session may be identified by the PDU session ID. In an example, the UDR may determine the charging control information for the NPN and/or CAG(s) based on the operator policy, the local policy and/or the configuration. In an example, the user subscription information may comprise an indication that the charging control is applied to the NPN and/or CAG(s) for the wireless device. In an example, the user subscription information may comprise at least one of: a charging rate for an NPN and/or CAG(s), a charging method (e.g. offline charging, online charging, or converged charging) for the NPN and/or CAG(s), or an address of a charging function for the NPN and/or CAG(s). In an example, the UDR may determine the charging control information based on the user subscription information. In an example, the charging control information may comprise at least one of: a charging rate, a charging method, or an address of a charging function. The charging method may comprise at least one of: offline charging, online charging, or converged charging. In an example action, the UDR may send to the PCF a response message (e.g. subscription retrieval response) comprising at least one of: the charging control information for the NPN and/or CAG(s); the NPN ID and/or CAG ID(s).

In response to the subscription retrieval response message received from the UDR, the PCF may take one or more actions. In an example action, the PCF may determine charging control policy for the NPN and/or CAG(s). The PCF may determine a charging control rule for the NPN ID and/or CAG ID(s) based on the information received from the UDR (e.g. charging control information) and/or the information received from the SMF (e.g. the NPN ID and/or CAG ID(s)) and/or the operator local policy. The charging control rule may comprise at least one of: a charging rate, a charging method, or an address of a charging function. The charging method may comprise at least one of: offline charging, online charging, or converged charging. In an example, the PCF may determine a charging rate (e.g. a flat rate) for the NPN and/or CAG(s) based on the charging control information received from the UDR and/or operator local policy. In an example, the PCF may determine a charging method (e.g. offline charging) for the NPN and/or CAG(s) based on the charging control information received from the UDR and/or local operator policy. In an example, the PCF may select a CHF (e.g. a specific CHF for an NPN and/or a CAG) for the NPN and/or CAG(s) based on the charging control information received from the UDR and/or local operator policy. In an example, the charging control rule determined by the PCF may be applied to the PDU session, a network slice (e.g. the S-NSSAI and/or the NSI ID of the S-NSSAI), a QoS flow and/or a service data flow for the NPN and/or CAG(s).

In an example action, the PCF may send to the SMF a message (e.g. policy establishment/modification response) comprising at least one of: the charging control rules for the NPN and/or CAG; the NPN ID and/or CAG ID(s); the PDU session ID; the S-NSSAI and/or the NSI ID of the S-NSSAI.

In response to the policy establishment/modification response message received from the PCF, the SMF may take one or more actions. In an example action, the SMF may send to the CHF a message (e.g. a charging data request) comprising at least one of: the NPN ID and/or CAG ID(s) for the PDU session and/or the UE; the PDU session ID; the at least one UE identity; or the S-NSSAI and/or the NSI ID of the S-NSSAI.

In response to the charging data request message, the CHF may determine a quota for the NPN and/or CAG(s) based on the information received from the SMF (e.g. the NPN ID and/or CAG ID(s)). In an example, the quota may comprise at least one of: a granted unit; a time quota threshold; or a volume quota threshold. In an example, the CHF may determine a higher granted unit for an NPN and/or a CAG. The CHF may send to the SMF a response message (e.g. charging data response) comprising the quota and/or the NPN ID and/or CAG ID(s).

In response to the charging data response, the SMF may take one or more actions. In an example action, the SMF may enforce the quota. In an example action, the SMF may enforce the charging control rule. In an example action, the SMF may select a UPF for the NPN and/or CAG(s) based on the NPN ID and/or CAG ID(s). In an example action, the SMF may select a UPF for the NPN and/or CAG(s) based on the quota and/or the charging control rule. In an example action, the SMF may determine at least one of the following user plane rules for the PDU session and/or the NPN and/or CAG(s) based on the quota and/or the charging control rule: at least one packet detection rule; at least one forwarding action rule; at least one QoS enforcement rule; or at least one usage reporting rule. In an example, the SMF may map the charging control rule to the user plane rules for the NPN and/or CAG(s). In an example action, the SMF may send to the UPF a message comprising the at least one user plane rules and/or the NPN ID and/or CAG ID(s).

In response to the message received from the SMF, the UPF may install the user plane rules, send to the SMF a response message (e.g. N4 session establishment/modification response), and enforce the user plane rules received from the SMF.

In an example, the UPF may enforce the at least one packet detection rule by matching a user data/traffic packet with service data flow template (e.g. service data flow filters and/or application identifiers), and may apply other user plane rules (e.g. forwarding action rule, QoS enforcement rule, and usage reporting rule) to the data/traffic packets matched the packet detection rule.

In an example, the UPF may enforce the at least one forwarding action rule by forwarding, duplicating, dropping or buffering a data/traffic packet respectively. In an example, the UPF may redirect the traffic to a web portal of the operator.

In an example, the UPF may enforce the at least one QoS enforcement rule by applying at least one of QoS parameters: 5QI, ARP, MBR, GBR to a service data flow; In an example, the UPF may enforce the at least one QoS enforcement rule by applying at least one of QoS parameters: Session AMBR and default 5QI/ARP combination to a PDU session.

In an example, the UPF may enforce the at least one usage reporting rule by measuring network resources usage in terms of traffic data volume, duration (i.e. time) and/or events, according to a measurement method in the usage reporting rule; the UPF may report the network resources usage to the SMF when the quota/threshold reached, and/or event and/or another trigger is (are) met.

In an example, the network resources usage reported to the SMF by the UPF may comprise traffic data volume, duration (i.e. time) applied to at least one of: the NPN ID and/or CAG ID(s), the UE, the PDU session, a QoS flow, a service data flow, an application, a network slice, or a data network.

The SMF may map the received network resources usage to the NPN ID and/or CAG ID(s) and/or PDU session and/or network slice and/or the UE. The SMF may send to the CHF a message (e.g. charging data request [update]) comprising the network resources usage and/or the NPN ID and/or CAG ID(s). The CHF may determine/update a new quota and send the new quota to the SMF in a response message (e.g. charging data response [update]). FIG. 16 is an example diagram depicting the procedures of PCF as per an aspect of an embodiment of the present disclosure. FIG. 17 is an example diagram depicting the procedures of SMF as per an aspect of an embodiment of the present disclosure.

In an example, a policy control function (PCF) may receive from a session management function (SMF), a first message requesting policy establishment for a packet data unit (PDU) session of the wireless device, the first message comprising at least one closed access group identifier (CAG ID). In an example, the PCF may receive from a unified data repository (UDR) a subscription response message comprising: the at least one CAG ID; and a charging control information for the at least one CAG ID. In an example, the PCF may determine a charging control rule for the at least one CAG ID of the PDU session based on the at least one CAG ID and the charging control information for the at least one CAG ID, wherein the charging control rule comprises: a charging rate for the at least one CAG ID; a charging method for the at least one CAG ID; and an address of a charging function for the at least one CAG ID. In an example, the PCF may send to the SMF, a second message comprising the charging control rule. In an example, the first message further comprises at least one of: an identity of the wireless device; a PDU session identifier; a first single network slice selection assistance information (S-NSSAI); or a first network slice instance identifier for the first S-NSSAI. In an example, the at least one CAG ID may comprise at least one identifier of a non-public network (NPN ID). In an example, the PCF may send to the UDR, a subscription request message for the at least one CAG ID and the first PDU session, the subscription request message comprises at least one of: the at least one CAG ID; an identity of the wireless device; or a PDU session identifier. In an example, the SMF may receive from an access and mobility management function (AMF), a PDU session create request message comprising the at least one CAG ID. In an example, the SMF may send to the CHF, a first charging request message for the at least one CAG ID and the PDU session comprising the at least one CAG ID. In an example, the CHF may determine a first quota information for the at least one CAG ID based on the at least one CAG ID, wherein the first quota information comprises at least one of: the at least one CAG ID; a granted unit; a time quota threshold; or a volume quota threshold. In an example, the CHF may send to the SMF, a first charging response message comprising the first quota information. In an example, the SMF may determine at least one user plane rule for the at least one CAG ID based on the first quota information. In an example, the SMF may determine at least one user plane rule for the at least one CAG ID based on the charging control rule. In an example, the SMF may send to a UPF, the at least one user plane rule and the at least one CAG ID. In an example, the at least one user plane rule comprises at least one of: at least one packet detection rule; or at least one usage reporting rule. In an example, the UPF may detect and collect the resource usage for the at least one CAG ID. In an example, the resource usage may comprise at least one of: time usage for the at least one CAG ID; or volume usage for the at least one CAG ID. In an example, the UPF may send to the SMF, the resource usage for the at least one CAG ID. In an example, the SMF may send to the CHF, a second charging request message comprising the resource usage. In an example, the CHF may determine, a second quota information for the at least one CAG ID based on the resource usage. In an example, the CHF may send to the SMF, a second charging response message comprising the second quota information. In an example, the charging control information for the at least one CAG ID may comprise a subscription charging rate for the at least one CAG ID. In an example, the charging control information for the at least one CAG ID comprises a subscription address of an CHF for the at least one CAG ID.

In an example, a session management function (SMF) may receive from an access and mobility management function (AMF), an establishment request message for a packet data unit (PDU) session of a wireless device, the establishment request message may comprise a closed access group identifier (CAG ID) for the PDU session and for the wireless device. In an example, the SMF may send to a policy control function (PCF) a policy establishment request comprising the CAG ID. In an example, the SMF may receive from the PCF, a policy establishment response message comprising a charging control rule, wherein the charging control rule comprises: a charging rate for the CAG ID; a charging method for the CAG ID; and an address of a CHF for the CAG ID. In an example, the SMF may send to a charging function (CHF), a charging data request message comprising the CAG ID. In an example, the SMF may receive from the CHF, a charging data response message comprising a quota information for the CAG ID. In an example, the SMF may determine a user plane rule for the CAG ID based on the charging control rule and the quota information. In an example, the SMF may select a user plane function (UPF) based on the CAG ID. In an example, the SMF may send to the UPF, the user plane rule, wherein the user plane rule comprises: at least one packet detection rule; or at least one usage reporting rule.

In an example, a charging function (CHF) may receive from a session management function (SMF), a charging data request message comprising a closed access group identifier (CAG ID) for a packet data unit session. In an example, the CHF may determine a quota information for the CAG ID, wherein the quota information comprises at least one of: a granted unit; a time quota threshold; or a volume quota threshold; and sending, by the CHF to the SMF, the quota information.

In an example, a policy control function (PCF) may receive from an application function (AF), a service information provisional message, the service information provisional message comprises: a close access group identifier (CAG ID); a service provider public land mobile network identifier (SP PLMN ID); an identifier of a wireless device; and service information for the wireless device. In an example, the PCF may map the SP PLMN ID and the service information to an internet protocol connectivity access network (IP-CAN) session based on the CAG ID and the identifier of the wireless device. In an example, the PCF may update/create a charging control rule for the CAG ID and the SP PLMN ID, wherein the charging control rule comprises: a charging rate for the CAG ID and the SP PLMN ID; a charging method for the CAG ID and the SP PLMN ID; and an address of a charging function for the CAG ID and the SP PLMN ID. In an example, the PCF may send to the SMF, the charging control rule.

According to various embodiments, a device such as, for example, a wireless device, off-network wireless device, a base station, a session management function, a policy control function, an application function, an access and mobility management function, a user plane function, a unified data management, a charging function and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

According to various embodiments, a session management function (SMF) may receive from an access and mobility management function (AMF), a message comprising a public land mobile network (PLMN) identifier of a PLMN of a wireless device. According to various embodiments, the SMF may send to a policy control function (PCF), a policy request message comprising: a non-public network (NPN) identifier of an NPN through which the wireless device accesses the PLMN; and the PLMN identifier of the PLMN. According to various embodiments, the SMF may receive from the PCF a policy response message comprising a charging control policy. According to various embodiments, the SMF may send to a charging function (CHF), a charging data request message based on the policy response message, wherein the charging data request message comprises the PLMN identifier.

According to various embodiments, the charging control policy may be determined based on the NPN identifier and the PLMN identifier. According to various embodiments, the message may further comprise at least one of: the NPN identifier; a wireless device identifier of the wireless device; a data network name (DNN); a single network slice selection assistance information (S-NSSAI); and/or a packet data unit (PDU) session identifier. According to various embodiments, the message may further comprise a PDU session establishment request message, wherein the PDU session establishment request message may comprise at least one of: the NPN identifier; and/or a packet data unit (PDU) session identifier. According to various embodiments, the NPN identifier is applied to at least one of: the wireless device; the DNN; a network slice identified by the S-NSSAI; and the PDU session identified by the PDU session identifier. According to various embodiments, the policy request message may further comprise at least one of: a wireless device identifier; a data network name (DNN); a single network slice selection assistance information (S-NSSAI); or a packet data unit (PDU) session identifier. According to various embodiments, the PCF may send to a unified data repository (UDR), a subscription request message for a NPN, and a packet data unit (PDU) session, wherein the subscription request message may comprise at least one of: the NPN identifier; the PLMN identifier; the wireless device identifier; a PDU session identifier; or a single network slice selection assistance information (S-NSSAI). According to various embodiments, the UDR may determine a charging control information applying to at least one of: the NPN; the wireless device; the PDU session; the S-NSSAI; and/or the DNN. According to various embodiments, the PCF may receive from the UDR, a subscription response message comprising at least one of: a charging control information for the NPN; and/or the NPN identifier. According to various embodiments, based on the charging control information for the NPN, the PCF may determine a charging control rule for the NPN, wherein the charging control rule may comprise at least one of: a charging rate for the NPN; a charging method for the NPN; and/or an address of a charging function for the NPN. According to various embodiments, the PCF may send to the SMF, a policy response message comprising at least one of: the charging control rule; the NPN identifier; the PDU session identifier; and/or the S-NSSAI. According to various embodiments, the AMF may receive from the wireless device, a Non-access stratum message comprising at least one of: a S-NSSAI; a DNN; and/or a PDU session identifier.

According to various embodiments, the AMF may receive from the wireless device, a Non-access stratum message comprising a PDU session establishment request message, wherein the PDU session establishment request message may comprise at least one of: the NPN identifier; and/or a PDU session identifier. According to various embodiments, the charging data request message may further comprise at least one of: the NPN identifier; a wireless device identifier; a PDU session identifier; or a single network slice selection assistance information (S-NSSAI). According to various embodiments, based on the NPN identifier, the CHF may determine a first quota information for the NPN, wherein the first quota information may comprise at least one of: the NPN identifier; a granted unit; a time quota threshold; and/or a volume quota threshold. According to various embodiments, the CHF may send to the SMF, a charging response message comprising the first quota information. According to various embodiments, the SMF may send to a UPF, a user plane message comprising at least one of: a user plane rule; and/or the identifier. According to various embodiments, the UPF may detect and collect resource usage for the NPN, wherein the resource usage may comprise at least one of: time usage for the NPN; and/or volume usage for the NPN. According to various embodiments, the UPF may send to the SMF, the resource usage for the NPN. According to various embodiments, the SMF may send to the CHF, a second charging request message comprising a resource usage for the NPN.

Figure 21:
FIG. 21 is a flow diagram as per an aspect of an example embodiment of the present disclosure.

FIG. 21 is a flow diagram as per an aspect of an example embodiment of the present disclosure. At 2110, a session management function (SMF) may send to a policy control function (PCF), a policy request message comprising: a non-public network (NPN) identifier of an NPN through which a wireless device accesses a public land mobile network (PLMN); and/or a PLMN identifier of the PLMN. At 2120, the SMF may receive from the PCF, a policy response message comprising a charging control policy.

According to various embodiments, the charging control policy may be determined based on the NPN identifier and the PLMN identifier. According to various embodiments, the SMF may receive from an access and mobility management function (AMF), a message comprising one or more of the NPN identifier and the PLMN identifier. According to various embodiments, the SMF may send to a charging function (CHF), a charging data request message based on the policy response message. According to various embodiments, the charging data request message may comprise the PLMN identifier. According to various embodiments, the policy request message may further comprise at least one of: a wireless device identifier of the wireless device; a data network name (DNN); a single network slice selection assistance information (S-NSSAI); and/or a packet data unit (PDU) session identifier. According to various embodiments, a session management function (SMF) may send to a policy control function (PCF), a policy request message comprising: a non-public network (NPN) identifier of an NPN through which a wireless device accesses a public land mobile network (PLMN); and/or a PLMN identifier of the PLMN. According to various embodiments, the SMF may receive from the PCF a policy response message comprising a charging control policy, wherein the charging control policy may be determined based on the NPN identifier and the PLMN identifier. According to various embodiments, the SMF may send to a charging function (CHF), a charging data request message based on the policy response message, wherein the charging data request message may comprise the PLMN identifier. According to various embodiments, the SMF may receive from an access and mobility management function (AMF), a message comprising one or more of the NPN identifier and the PLMN identifier. According to various embodiments, the policy request message may further comprise at least one of: a wireless device identifier of the wireless device; a data network name (DNN); a single network slice selection assistance information (S-NSSAI); and/or a packet data unit (PDU) session identifier. According to various embodiments, a session management function (SMF) may receive from an access and mobility management function (AMF), a message comprising a wireless device identifier of a wireless device, a public land mobile network (PLMN) identifier of the wireless device, a non-public network (NPN) identifier of an NPN through which the wireless device accesses the PLMN, and one or more of: a data network name (DNN); a single network slice selection assistance information (S-NSSAI); and/or a packet data unit (PDU) session identifier. According to various embodiments, the SMF may send to a policy control function (PCF), a policy request message comprising the wireless device identifier, the PLMN identifier, the NPN identifier, and one or more of: the DNN; the S-NSSAI; and/or the PDU session identifier. According to various embodiments, based on the NPN identifier, the PLMN identifier, and a charging control information for the NPN received from a unified data repository (UDR), the PCF may determine a charging control policy. According to various embodiments, the SMF may receive from the PCF, a policy response message comprising the charging control policy. According to various embodiments, the SMF may send to a charging function (CHF), a charging data request message based on the policy response message, wherein the charging data request message may comprise the PLMN identifier.

Figure 22:
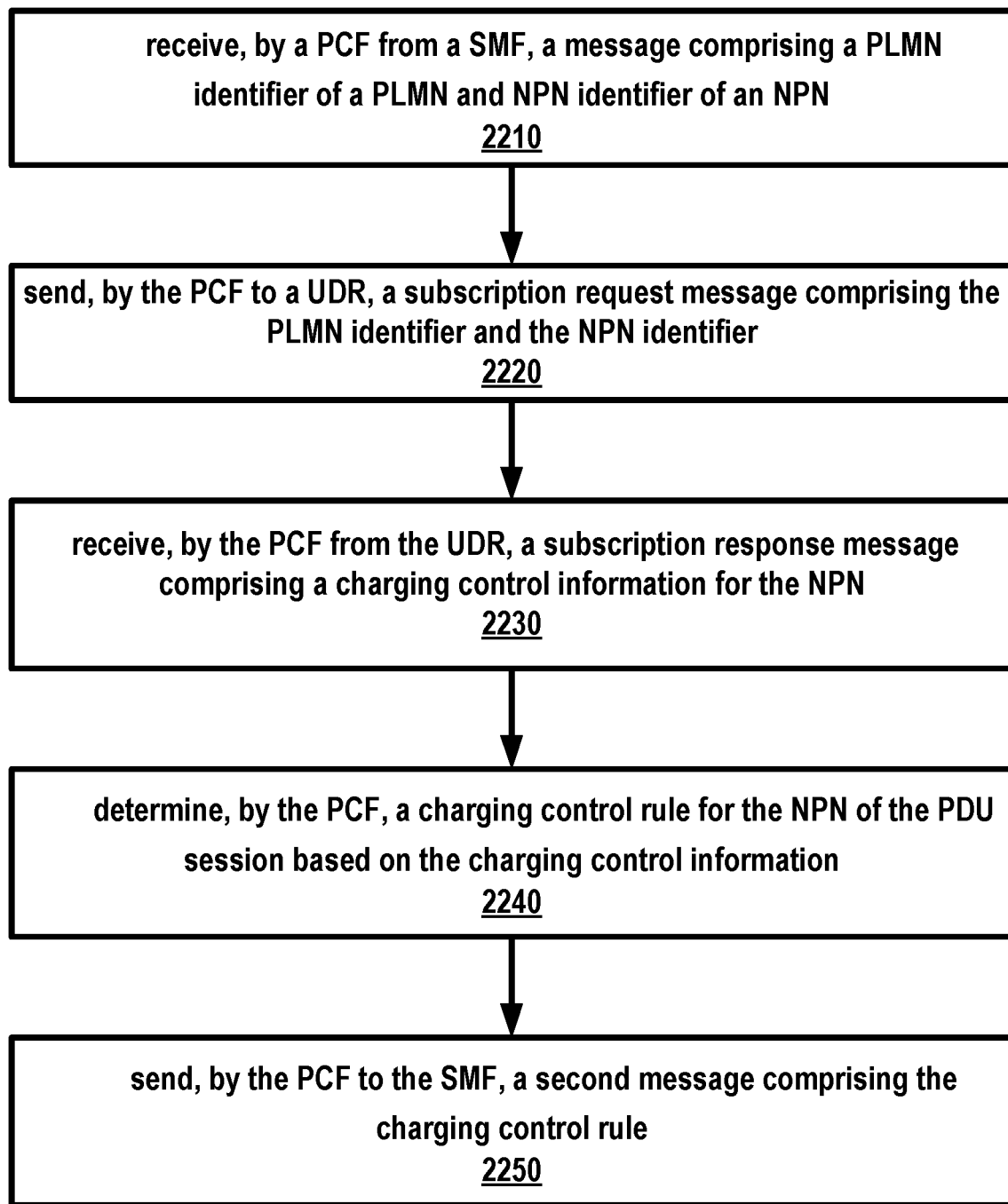
FIG. 22 is a flow diagram as per an aspect of an example embodiment of the present disclosure.

FIG. 22 is a flow diagram as per an aspect of an example embodiment of the present disclosure. At 2210, a policy control function (PCF) may receive from a session management function (SMF), a message comprising: a public land mobile network (PLMN) identifier of a PLMN; and/or a non-public network (NPN) identifier of an NPN. At 2220, the PCF may send to a unified data repository (UDR), a subscription request message comprising the PLMN identifier and the NPN identifier. At 2230, the PCF may receive from the UDR, a subscription response message comprising a charging control information for the NPN. At 2240, the PCF may determine a charging control rule for the NPN of the PDU session based on the charging control information. At 2250, the PCF may send to the SMF, a second message comprising the charging control rule.

According to various embodiments, the message may comprise a request for policy establishment for a packet data unit (PDU) session of a wireless device. According to various embodiments, the NPN identifier may identify an NPN through which the wireless device accesses a PLMN associated with the PLMN identifier. According to various embodiments, the subscription response message may further comprise the NPN identifier. According to various embodiments, the determining the charging control rule may be further based on the PLMN identifier and the NPN identifier. According to various embodiments, the charging control rule may comprise one or more of: a charging rate for the NPN; a charging method for the NPN; and/or an address of a charging function for the NPN. According to various embodiments, a policy control function (PCF) may receive from a session management function (SMF), a message comprising a request for policy establishment for a packet data unit (PDU) session of a wireless device comprising: a public land mobile network (PLMN) identifier of a PLMN; and/or a non-public network (NPN) identifier of an NPN through which the wireless device accesses the PLMN. According to various embodiments, the PCF may send to a unified data repository (UDR), a subscription request message comprising the PLMN identifier and the NPN identifier. According to various embodiments, the PCF may receive from the UDR, a subscription response message comprising a charging control information for the NPN. According to various embodiments, the PCF may determine a charging control rule for the NPN of the PDU session based on the charging control information. According to various embodiments, the PCF may send to the SMF, a second message comprising the charging control rule. According to various embodiments, the charging control rule may comprise one or more of: a charging rate for the NPN; a charging method for the NPN; and/or an address of a charging function for the NPN. According to various embodiments, a policy control function (PCF) may receive from a session management function (SMF), a message comprising a request for policy establishment for a packet data unit (PDU) session of a wireless device comprising: a public land mobile network (PLMN) identifier of a PLMN; and/or a non-public network (NPN) identifier of an NPN through which the wireless device accesses the PLMN. According to various embodiments, the PCF may send to a unified data repository (UDR), a subscription request message comprising the PLMN identifier and the NPN identifier. According to various embodiments, the PCF may receive from the UDR, a subscription response message comprising a charging control information for the NPN. According to various embodiments, the PCF may determine a charging control rule for the NPN of the PDU session based on the charging control information, the PLMN identifier, and/or the NPN identifier. The charging control rule may comprise one or more of: a charging rate for the NPN; a charging method for the NPN; and/or an address of a charging function for the NPN. According to various embodiments, the PCF may send to the SMF, a second message comprising the charging control rule.

According to various embodiments, a policy control function (PCF) may receive from a session management function (SMF), a message comprising a request for policy establishment for a packet data unit (PDU) session of a wireless device comprising: a public land mobile network (PLMN) identifier of a PLMN; and a non-public network (NPN) identifier of an NPN through which the wireless device accesses the PLMN. According to various embodiments, the PCF may send to a unified data repository (UDR), a subscription request message comprising the PLMN identifier and the NPN identifier. According to various embodiments, the PCF may receive from the UDR, a subscription response message comprising a charging control information for the NPN. According to various embodiments, the PCF may determine a charging control rule for the NPN of the PDU session based on the charging control information, the PLMN identifier, and/or the NPN identifier. The charging control rule may comprise one or more of: a charging rate for the NPN; a charging method for the NPN; and/or an address of a charging function for the NPN. According to various embodiments, the PCF may send to the SMF a second message comprising the charging control rule.

Figure 23:
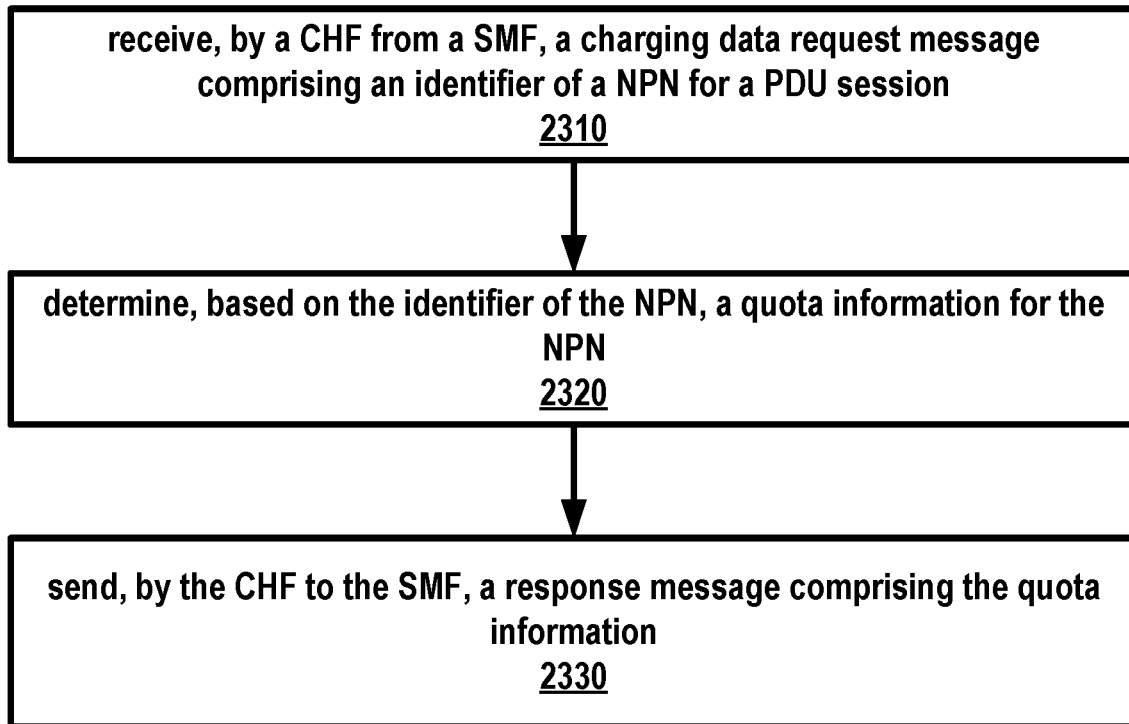
FIG. 23 is a flow diagram as per an aspect of an example embodiment of the present disclosure.

FIG. 23 is a flow diagram as per an aspect of an example embodiment of the present disclosure. At 2310, a charging function (CHF) may receive from a session management function (SMF) a charging data request message. The charging data request message may comprise an identifier of a non-public network (NPN) for a packet data unit (PDU) session. At 2320, based on the identifier of the NPN, the CHF may determine a quota information for the NPN. At 2330, the CHF may send to the SMF, a response message comprising the quota information.

According to various embodiments, the quota information may comprise a granted unit for the NPN. According to various embodiments, the quota information may comprise a time quota threshold for the NPN. According to various embodiments, the quota information may comprise a volume quota threshold for the NPN. According to various embodiments, the response message may further comprise the NPN identifier. According to various embodiments, the CHF may receive from the SMF, a second charging request message comprising a resource usage for the NPN. According to various embodiments, a charging function (CHF) may receive from a session management function (SMF), a charging data request message comprising an identifier of a non-public network (NPN) for a packet data unit (PDU) session. According to various embodiments, based on the identifier of the NPN, the CHF may determine a quota information for the NPN. The quota information may comprise one or more of: a granted unit for the NPN; a time quota threshold for the NPN; and a volume quota threshold for the NPN. According to various embodiments, the CHF may send to the SMF, a response message comprising the quota information. According to various embodiments, the response message may further comprise the NPN identifier.

According to various embodiments, a charging function (CHF) may receive from a session management function (SMF) a charging data request message. The charging data request message may comprise an identifier of a non-public network (NPN) for a packet data unit (PDU) session. According to various embodiments, based on the identifier of the NPN, the CHF may determine a quota information for the NPN. The quota information may comprise one or more of: a granted unit for the NPN; a time quota threshold for the NPN; and a volume quota threshold for the NPN. According to various embodiments, the CHF may send to the SMF a response message. The response message may comprise the quota information and the NPN identifier. According to various embodiments, the CHF may receive from the SMF a second charging request message comprising a resource usage for the NPN. According to various embodiments, the second charging request message may comprise the NPN identifier.

According to various embodiments, a session management function (SMF) may comprise one or more processors and memory storing instructions that, when executed by the one or more processors, cause the SMF to receive, from an access and mobility management function (AMF), a message comprising a public land mobile network (PLMN) identifier of a PLMN of a wireless device. According to various embodiments, a SMF may comprise one or more processors and memory storing instructions that, when executed by the one or more processors, cause the SMF to send, to a policy control function (PCF), a policy request message comprising: a non-public network (NPN) identifier of an NPN through which the wireless device accesses the PLMN; and the PLMN identifier of the PLMN. According to various embodiments, the SMF may comprise one or more processors and memory storing instructions that, when executed by the one or more processors, cause the SMF to receive, from the PCF, a policy response message comprising a charging control policy. According to various embodiments, the SMF may comprise one or more processors and memory storing instructions that, when executed by the one or more processors, cause the SMF to send to a charging function (CHF), a charging data request message based on the policy response message, wherein the charging data request message may comprise the PLMN identifier.

According to various embodiments, a SMF may comprise one or more processors and memory storing instructions that, when executed by the one or more processors, cause the SMF to send, to a policy control function (PCF), a policy request message. The policy request message may comprise a non-public network (NPN) identifier of an NPN through which a wireless device accesses a public land mobile network (PLMN); and a PLMN identifier of the PLMN. According to various embodiments, the SMF may comprise one or more processors and memory storing instructions that, when executed by the one or more processors, cause the SMF to receive, from the PCF, a policy response message comprising a charging control policy.

According to various embodiments, a SMF may comprise one or more processors and memory storing instructions that, when executed by the one or more processors, cause the SMF to send to a policy control function (PCF), a policy request message comprising: a non-public network (NPN) identifier of an NPN through which a wireless device accesses a public land mobile network (PLMN); and a PLMN identifier of the PLMN. According to various embodiments, the SMF may comprise one or more processors and memory storing instructions that, when executed by the one or more processors, cause the SMF to receive from the PCF, a policy response message comprising a charging control policy, wherein the charging control policy may be determined based on the NPN identifier and the PLMN identifier. According to various embodiments, the SMF may comprise one or more processors and memory storing instructions that, when executed by the one or more processors, cause the SMF to send to a charging function (CHF), a charging data request message based on the policy response message, wherein the charging data request message comprises the PLMN identifier.

According to various embodiments, a SMF may comprise one or more processors and memory storing instructions that, when executed by the one or more processors, cause the SMF to receive from an access and mobility management function (AMF), a message comprising a wireless device identifier of a wireless device, a public land mobile network (PLMN) identifier of the wireless device, a non-public network (NPN) identifier of an NPN through which the wireless device accesses the PLMN, and one or more of a data network name (DNN); a single network slice selection assistance information (S-NSSAI); and/or a packet data unit (PDU) session identifier.

According to various embodiments, a SMF may comprise one or more processors and memory storing instructions that, when executed by the one or more processors, cause the SMF to send a policy request message comprising the wireless device identifier, the PLMN identifier, the NPN identifier, and one or more of: the DNN; the S-NSSAI; and/or the PDU session identifier. According to various embodiments, the SMF may comprise one or more processors and memory storing instructions that, when executed by the one or more processors, cause the SMF to receive a policy response message comprising the charging control policy. According to various embodiments, the SMF may comprise one or more processors and memory storing instructions that, when executed by the one or more processors, cause the SMF to send to a charging function (CHF), a charging data request message based on the policy response message, wherein the charging data request message comprises the PLMN identifier.

According to various embodiments, a policy control function (PCF) may comprise one or more processors and memory storing instructions that, when executed by the one or more processors, cause the PCF to receive the policy request message. According to various embodiments, a policy control function (PCF) may comprise one or more processors and memory storing instructions that, when executed by the one or more processors, cause the PCF to determine a charging control policy based on the NPN identifier, the PLMN identifier, and a charging control information for the NPN received from a unified data repository (UDR). According to various embodiments, a policy control function (PCF) may comprise one or more processors and memory storing instructions that, when executed by the one or more processors, cause the PCF to send the policy response message.

According to various embodiments, a PCF may comprise one or more processors and memory storing instructions that, when executed by the one or more processors, cause the PCF to receive from a session management function (SMF), a message comprising: a public land mobile network (PLMN) identifier of a PLMN; and a non-public network (NPN) identifier of an NPN. According to various embodiments, the PCF may comprise one or more processors and memory storing instructions that, when executed by the one or more processors, cause the PCF to send to a unified data repository (UDR), a subscription request message comprising the PLMN identifier and the NPN identifier. According to various embodiments, the PCF may comprise one or more processors and memory storing instructions that, when executed by the one or more processors, cause the PCF to receive from the UDR, a subscription response message comprising a charging control information for the NPN. According to various embodiments, the PCF may comprise one or more processors and memory storing instructions that, when executed by the one or more processors, cause the PCF to determine a charging control rule for the NPN of the PDU session based on the charging control information. According to various embodiments, the PCF may comprise one or more processors and memory storing instructions that, when executed by the one or more processors, cause the PCF to send to the SMF, a second message comprising the charging control rule.

According to various embodiments, a PCF may comprise one or more processors and memory storing instructions that, when executed by the one or more processors, cause the PCF to one or more processors and memory storing instructions that, when executed by the one or more processors, cause the PCF to receive, from a session management function (SMF), a message comprising a request for policy establishment for a packet data unit (PDU) session of a wireless device comprising: a public land mobile network (PLMN) identifier of a PLMN; and a non-public network (NPN) identifier of an NPN through which the wireless device accesses the PLMN. According to various embodiments, the PCF may comprise one or more processors and memory storing instructions that, when executed by the one or more processors, cause the PCF to send to a unified data repository (UDR), a subscription request message comprising the PLMN identifier and the NPN identifier. According to various embodiments, the PCF may comprise one or more processors and memory storing instructions that, when executed by the one or more processors, cause the PCF to receive from the UDR, a subscription response message comprising a charging control information for the NPN. According to various embodiments, the PCF may comprise one or more processors and memory storing instructions that, when executed by the one or more processors, cause the PCF to determine a charging control rule for the NPN of the PDU session based on the charging control information, the PLMN identifier, and the NPN identifier. According to various embodiments, the PCF may comprise one or more processors and memory storing instructions that, when executed by the one or more processors, cause the PCF to send to the SMF, a second message comprising the charging control rule.

According to various embodiments, a PCF may comprise one or more processors and memory storing instructions that, when executed by the one or more processors, cause the PCF to one or more processors and memory storing instructions that, when executed by the one or more processors, cause the PCF to receive, from a session management function (SMF), a message comprising a request for policy establishment for a packet data unit (PDU) session of a wireless device comprising: a public land mobile network (PLMN) identifier of a PLMN; and a non-public network (NPN) identifier of an NPN through which the wireless device accesses the PLMN. According to various embodiments, the PCF may comprise one or more processors and memory storing instructions that, when executed by the one or more processors, cause the PCF to send to a unified data repository (UDR), a subscription request message comprising the PLMN identifier and the NPN identifier. According to various embodiments, the PCF may comprise one or more processors and memory storing instructions that, when executed by the one or more processors, cause the PCF to receive from the UDR, a subscription response message comprising a charging control information for the NPN. According to various embodiments, the PCF may comprise one or more processors and memory storing instructions that, when executed by the one or more processors, cause the PCF to determine a charging control rule for the NPN of the PDU session based on the charging control information, the PLMN identifier, and the NPN identifier wherein the charging control rule comprises one or more of: a charging rate for the NPN; a charging method for the NPN; and an address of a charging function for the NPN. According to various embodiments, the PCF may comprise one or more processors and memory storing instructions that, when executed by the one or more processors, cause the PCF to send to the SMF, a second message comprising the charging control rule.

According to various embodiments, a charging function (CHF) may comprising one or more processors and memory storing instructions that, when executed by the one or more processors, cause the CHF to receive, from a session management function (SMF), a charging data request message comprising an identifier of a non-public network (NPN) for a packet data unit (PDU) session. According to various embodiments, a charging function (CHF) may comprising one or more processors and memory storing instructions that, when executed by the one or more processors, cause the CHF to determine a quota information for the NPN based on the identifier of the NPN. According to various embodiments, a charging function (CHF) may comprising one or more processors and memory storing instructions that, when executed by the one or more processors, cause the CHF to send to the SMF, a response message comprising the quota information.

According to various embodiments, a charging function (CHF) may comprise one or more processors and memory storing instructions that, when executed by the one or more processors, cause the CHF to receive from a session management function (SMF), a charging data request message comprising an identifier of a non-public network (NPN) for a packet data unit (PDU) session. According to various embodiments, a charging function (CHF) may comprise one or more processors and memory storing instructions that, when executed by the one or more processors, cause the CHF to determine a quota information for the NPN based on the identifier of the NPN. The quota information may comprise one or more of: a granted unit for the NPN; a time quota threshold for the NPN; and/or a volume quota threshold for the NPN. According to various embodiments, a charging function (CHF) may comprise one or more processors and memory storing instructions that, when executed by the one or more processors, cause the CHF to send to the SMF a response message comprising the quota information.

According to various embodiments, a session management function (SMF) may receive from an access and mobility management function (AMF), a message comprising a closed access group identifier (CAG ID) for a packet data unit (PDU) session of a wireless device. According to various embodiments, the SMF may send to a policy control function (PCF), a policy request message comprising the CAG ID. According to various embodiments, the SMF may receive from the PCF, a policy response message comprising a charging control rule. The charging control rule may comprise: a charging rate for the CAG ID; and a charging method for the CAG ID. According to various embodiments, based on the policy response message, the SMF may send to a charging function (CHF) a charging data request message, wherein the charging data request message may comprise the CAG ID. According to various embodiments, the CAG ID may be applied to at least one of: the wireless device; the PDU session; a network slice; and/or a data network name (DNN); According to various embodiments, the policy request message may further comprise at least one of: a wireless device identifier of the wireless device; a public land mobile network (PLMN) identifier of a PLMN of the wireless device; a data network name (DNN); a single network slice selection assistance information (S-NSSAI); and/or a PDU session identifier of the PDU session. According to various embodiments, the PCF may send to a unified data repository (UDR), a subscription request message for the CAG ID and the PDU session, wherein the subscription request message comprises at least one of: a wireless device identifier of the wireless device; a public land mobile network (PLMN) identifier of a PLMN of the wireless device; a data network name (DNN); a single network slice selection assistance information (S-NSSAI); and/or a PDU session identifier of the PDU session. According to various embodiments, the UDR may determine, a charging control information applying to at least one of: the CAG; the wireless device; the PDU session; the S-NSSAI; and/or the DNN. According to various embodiments, the PCF may receive from the UDR, a subscription response message comprising at least one of: a charging control information for the CAG; and/or the CAG ID. According to various embodiments, based on the charging control information for the CAG, the PCF may determine the charging control rule for the CAG, wherein the charging control rule comprises at least one of: the charging rate for the CAG; the charging method for the CAG; and/or an address of a charging function for the CAG. According to various embodiments, the policy response message may further comprise at least one of: the CAG ID; a PDU session identifier of the PDU session; and/or a single network slice selection assistance information (S-NSSAI).

According to various embodiments, the AMF may receive from a wireless device, a Non-access stratum message comprising at least one of: a single network slice selection assistance information (S-NSSAI); a data network name (DNN); and/or a PDU session identifier of the PDU session. According to various embodiments, the AMF may receive from the wireless device, a Non-access stratum message comprising a PDU session establishment request message, wherein the PDU session establishment request message comprises at least one of: a CAG ID; and/or a PDU session identifier of the PDU session. According to various embodiments, the charging data request message may further comprise at least one of: a wireless device identifier of the wireless device; a PDU session identifier of the PDU session; and/or a single network slice selection assistance information (S-NSSAI). According to various embodiments, based on the CAG ID, the CHF may determine, a first quota information for the CAG, wherein the first quota information may comprise at least one of: the CAG ID; a granted unit; a time quota threshold; and/or a volume quota threshold. According to various embodiments, the CHF may send to the SMF, a charging response message comprising the first quota information. According to various embodiments, the SMF may send to a UPF, a user plane message comprising at least one of: a user plane rule; and/or a CAG ID. According to various embodiments, the user plane rule may be determined based on at least one of: quota information for the CAG received from a CHF; and/or the charging control rule for the CAG received from the PCF. According to various embodiments, a UPF may detect and collect, resource usage for the CAG, wherein the resource usage may comprise at least one of: time usage for the CAG; and/or volume usage for the CAG. According to various embodiments, the UPF may send to the SMF the resource usage for the CAG. According to various embodiments, the SMF may send to the CHF a second charging request message comprising the resource usage for the CAG. According to various embodiments, based on the resource usage, the CHF may determine a second quota information for the CAG. According to various embodiments, the CHF may send to the SMF, a second charging response message comprising the second quota information.

Figure 24:
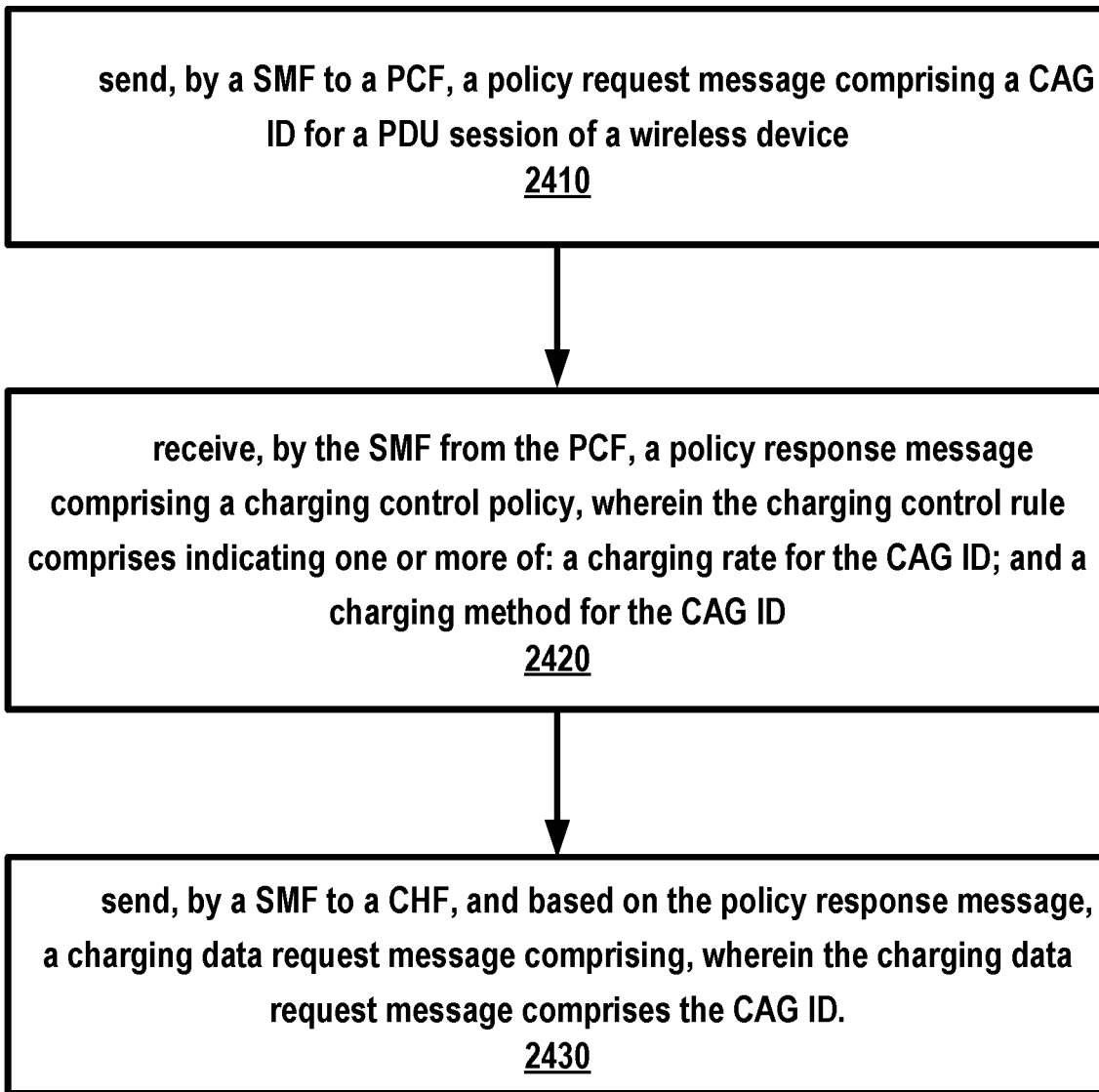
FIG. 24 is a flow diagram as per an aspect of an example embodiment of the present disclosure.

FIG. 24 is a flow diagram as per an aspect of an example embodiment of the present disclosure. At 2410, a session management function (SMF) may send to a policy control function (PCF), a policy request message comprising a closed access group identifier (CAG ID) for a packet data unit (PDU) session of a wireless device. At 2420, the SMF may receive from the PCF, a policy response message comprising a charging control policy indicating one or more of: a charging rate for the CAG ID; and a charging method for the CAG ID. At 2430, based on the policy response message, the SMF may send to a charging function (CHF), a charging data request message comprising the CAG ID.

According to various embodiments, the CAG ID may be for a packet data unit (PDU) session of a wireless device. According to various embodiments, the charging control policy may comprise a charging control rule indicating the charging rate and the charging method. According to various embodiments, the SMF may receive from an access and mobility management function (AMF) a message comprising the CAG ID. According to various embodiments, the policy request message may further comprise at least one of: a wireless device identifier of the wireless device; a public land mobile network (PLMN) identifier of a PLMN of the wireless device; a data network name (DNN); a single network slice selection assistance information (S-NSSAI); and/or a PDU session identifier of the PDU session. According to various embodiments, the policy response message may further comprise at least one of: the CAG ID; a PDU session identifier of the PDU session; and/or a single network slice selection assistance information (S-NSSAI). According to various embodiments, the SMF may send to a UPF, a user plane message comprising at least one of: a user plane rule; and/or a CAG ID. According to various embodiments, the user plane rule may be determined based on at least one of: quota information for the CAG received from a charging function (CHF); and/or the charging control rule for the CAG received from the PCF. According to various embodiments, a UPF may detect and collect resource usage for the CAG, wherein the resource usage may comprise at least one of: time usage for the CAG; and/or volume usage for the CAG. According to various embodiments, the UPF may send to the SMF the resource usage for the CAG. According to various embodiments, the SMF may send to the CHF a second charging request message comprising the resource usage for the CAG.

According to various embodiments, a policy control function (PCF) may receive from a session management function (SMF), a policy request message comprising a closed access group identifier (CAG ID) for a packet data unit (PDU) session of a wireless device. According to various embodiments, the PCF may send to a unified data repository (UDR) a subscription request message comprising the CAG ID. According to various embodiments, the PCF may receive from the UDR, a subscription response message comprising: the CAG ID; and charging control information for the CAG ID. According to various embodiments, based on the CAG ID and the charging control information, the PCF may determine a charging control rule for the CAG of the PDU session. The charging control rule may comprise: a charging rate for the CAG; a charging method for the CAG; and an address of a charging function for the CAG. According to various embodiments, the PCF may send to the SMF a policy response message comprising the charging control rule. According to various embodiments, the policy request message may further comprise at least one of: a wireless device identifier of the wireless device; a public land mobile network (PLMN) identifier of a PLMN of the wireless device; a data network name (DNN); a single network slice selection assistance information (S-NSSAI); and/or a PDU session identifier of the PDU session. According to various embodiments, the subscription request message may comprise at least one of: a wireless device identifier of the wireless device; a public land mobile network (PLMN) identifier of a PLMN of the wireless device; a data network name (DNN); a single network slice selection assistance information (S-NSSAI); and/or a PDU session identifier of the PDU session. According to various embodiments, the UDR may determine, a charging control information applying to at least one of: the CAG; the wireless device; the PDU session; the S-NSSAI; and/or the DNN.

Figure 25:
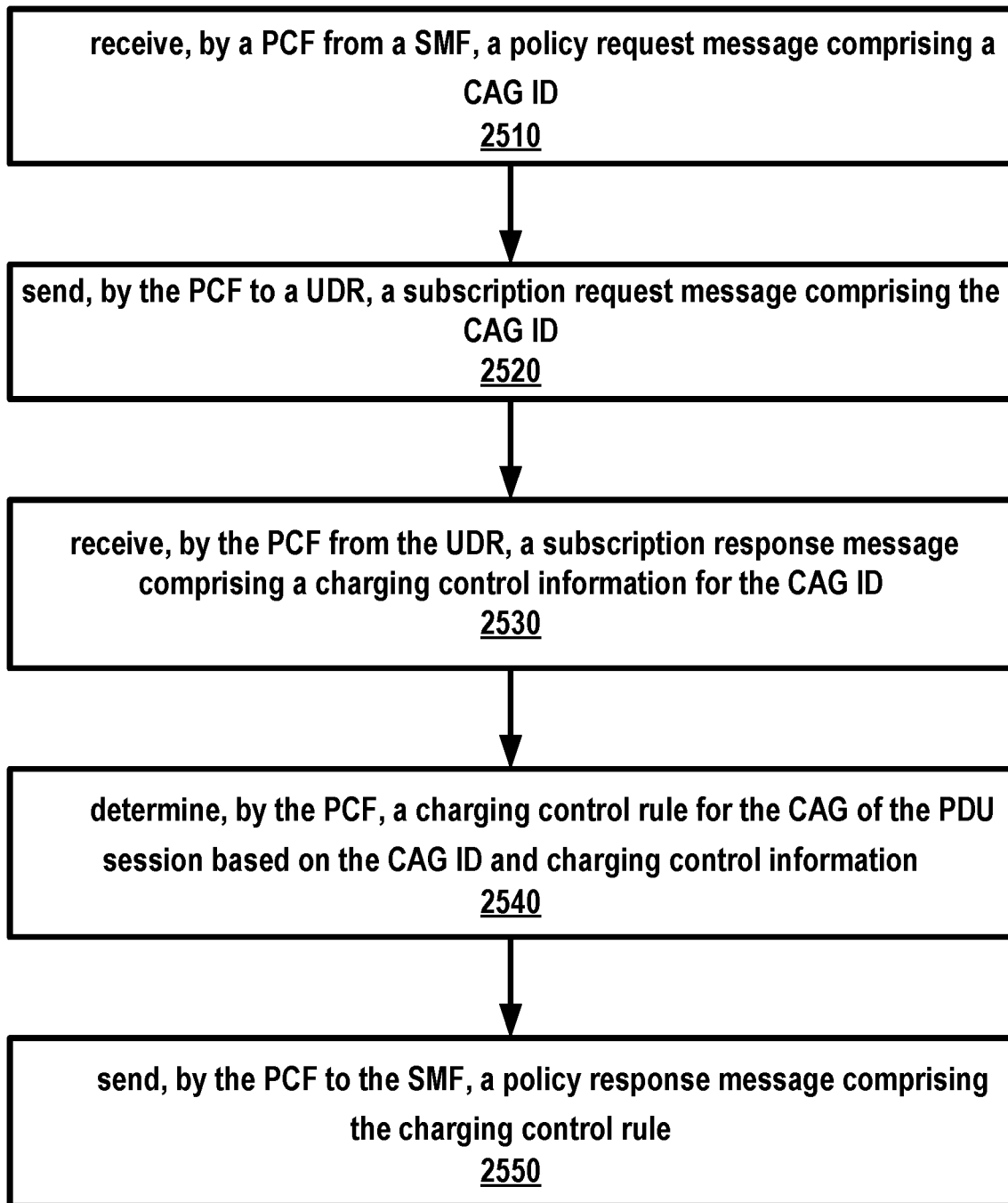
FIG. 25 is a flow diagram as per an aspect of an example embodiment of the present disclosure.

FIG. 25 is a flow diagram as per an aspect of an example embodiment of the present disclosure. At 2510, a policy control function (PCF) may receive from a session management function (SMF), a policy request message comprising a closed access group identifier (CAG ID). At 2520, the PCF may send to a unified data repository (UDR), a subscription request message comprising the CAG ID. At 2530, the PCF may receive from the UDR, a subscription response message comprising a charging control information for the CAG ID. At 2540, the PCF may determine a charging control rule for the CAG of the PDU session based on the CAG ID and the charging control information. At 2550, the PCF may send to the SMF a policy response message comprising the charging control rule.

According to various embodiments, the CAG ID may be for a packet data unit (PDU) session of a wireless device. According to various embodiments, the charging control rule may comprise a charging rate for the CAG. According to various embodiments, the charging control rule may comprise a charging method for the CAG. According to various embodiments, the charging control rule may comprise an address of a charging function for the CAG. According to various embodiments, a charging function (CHF) may receive from a session management function (SMF) a charging data request message. The charging data request message may comprise a closed access group identifier (CAG ID) for a packet data unit (PDU) session of a wireless device. According to various embodiments, based on the CAG ID, the CHF may determine a quota information for the CAG, wherein the quota information may comprise at least one of: a granted unit for the CAG; a time quota threshold for the CAG; and/or a volume quota threshold for the CAG. According to various embodiments, the CHF may send to the SMF, a response message comprising the CAG ID and the quota information.

According to various embodiments, a session management function (SMF) may comprise one or more processors and memory storing instructions that, when executed by the one or more processors, cause the SMF to receive from an access and mobility management function (AMF), a message comprising a closed access group identifier (CAG ID) for a packet data unit (PDU) session of a wireless device. According to various embodiments, the SMF may comprise one or more processors and memory storing instructions that, when executed by the one or more processors, cause the SMF to send to a policy control function (PCF), a policy request message comprising the CAG ID. According to various embodiments, the SMF may comprise one or more processors and memory storing instructions that, when executed by the one or more processors, cause the SMF to receive from the PCF, a policy response message comprising a charging control policy, wherein the charging control rule may comprise: a charging rate for the CAG ID; and a charging method for the CAG ID. According to various embodiments, the SMF may comprise one or more processors and memory storing instructions that, when executed by the one or more processors, cause the SMF to send to a charging function (CHF), and based on the policy response message, a charging data request message, wherein the charging data request message comprises the CAG ID. According to various embodiments, the SMF may comprise one or more processors and memory storing instructions that, when executed by the one or more processors, cause the SMF to send to a policy control function (PCF), a policy request message comprising a closed access group identifier (CAG ID) for a packet data unit (PDU) session of a wireless device. According to various embodiments, the SMF may comprise one or more processors and memory storing instructions that, when executed by the one or more processors, cause the SMF to receive from the PCF, a policy response message comprising a charging control policy. The charging control policy may indicate one or more of: a charging rate for the CAG ID; and/or a charging method for the CAG ID. According to various embodiments, the SMF may comprise one or more processors and memory storing instructions that, when executed by the one or more processors, cause the SMF to send to a charging function (CHF), and based on the policy response message, a charging data request message comprising the CAG ID.

According to various embodiments, a policy control function (PCF) may comprise one or more processors and memory storing instructions that, when executed by the one or more processors, cause the PCF to receive, from a session management function (SMF), a policy request message comprising a closed access group identifier (CAG ID) for a packet data unit (PDU) session of a wireless device. According to various embodiments, the PCF may comprise one or more processors and memory storing instructions that, when executed by the one or more processors, cause the PCF to send to a unified data repository (UDR), a subscription request message comprising the CAG ID. According to various embodiments, the PCF may comprise one or more processors and memory storing instructions that, when executed by the one or more processors, cause the PCF to receive from the UDR, a subscription response message comprising: the CAG ID; and charging control information for the CAG ID. According to various embodiments, the PCF may comprise one or more processors and memory storing instructions that, when executed by the one or more processors, cause the PCF to determine a charging control rule for the CAG of the PDU session based on the CAG ID and the charging control information. The charging control rule may comprise: a charging rate for the CAG; a charging method for the CAG; and an address of a charging function for the CAG. According to various embodiments, the PCF may comprise one or more processors and memory storing instructions that, when executed by the one or more processors, cause the PCF to send to the SMF, a policy response message comprising the charging control rule.

According to various embodiments, a policy control function (PCF) may comprise one or more processors and memory storing instructions that, when executed by the one or more processors, cause the PCF to receive from a session management function (SMF), a policy request message comprising a closed access group identifier (CAG ID). According to various embodiments, the PCF may comprise one or more processors and memory storing instructions that, when executed by the one or more processors, cause the PCF to send to a unified data repository (UDR), a subscription request message comprising the CAG ID. According to various embodiments, the PCF may comprise one or more processors and memory storing instructions that, when executed by the one or more processors, cause the PCF to receive from the UDR, a subscription response message comprising a charging control information for the CAG ID. According to various embodiments, the PCF may comprise one or more processors and memory storing instructions that, when executed by the one or more processors, cause the PCF to determine a charging control rule for the CAG of the PDU session based on the CAG ID and the charging control information. According to various embodiments, the PCF may comprise one or more processors and memory storing instructions that, when executed by the one or more processors, cause the PCF to send to the SMF, a policy response message comprising the charging control rule.

According to various embodiments, a charging function (CHF) may comprise one or more processors and memory storing instructions that, when executed by the one or more processors, cause the CHF to receive, from a session management function (SMF), a charging data request message comprising a closed access group identifier (CAG ID) for a packet data unit (PDU) session of a wireless device. According to various embodiments, the CHF may comprise one or more processors and memory storing instructions that, when executed by the one or more processors, cause the CHF to determine, based on the CAG ID, a quota information for the CAG, wherein the quota information may comprise at least one of: a granted unit for the CAG; a time quota threshold for the CAG; and/or a volume quota threshold for the CAG. According to various embodiments, the CHF may comprise one or more processors and memory storing instructions that, when executed by the one or more processors, cause the CHF to send to the SMF, a response message comprising the CAG ID and the quota information.

Figure 26:
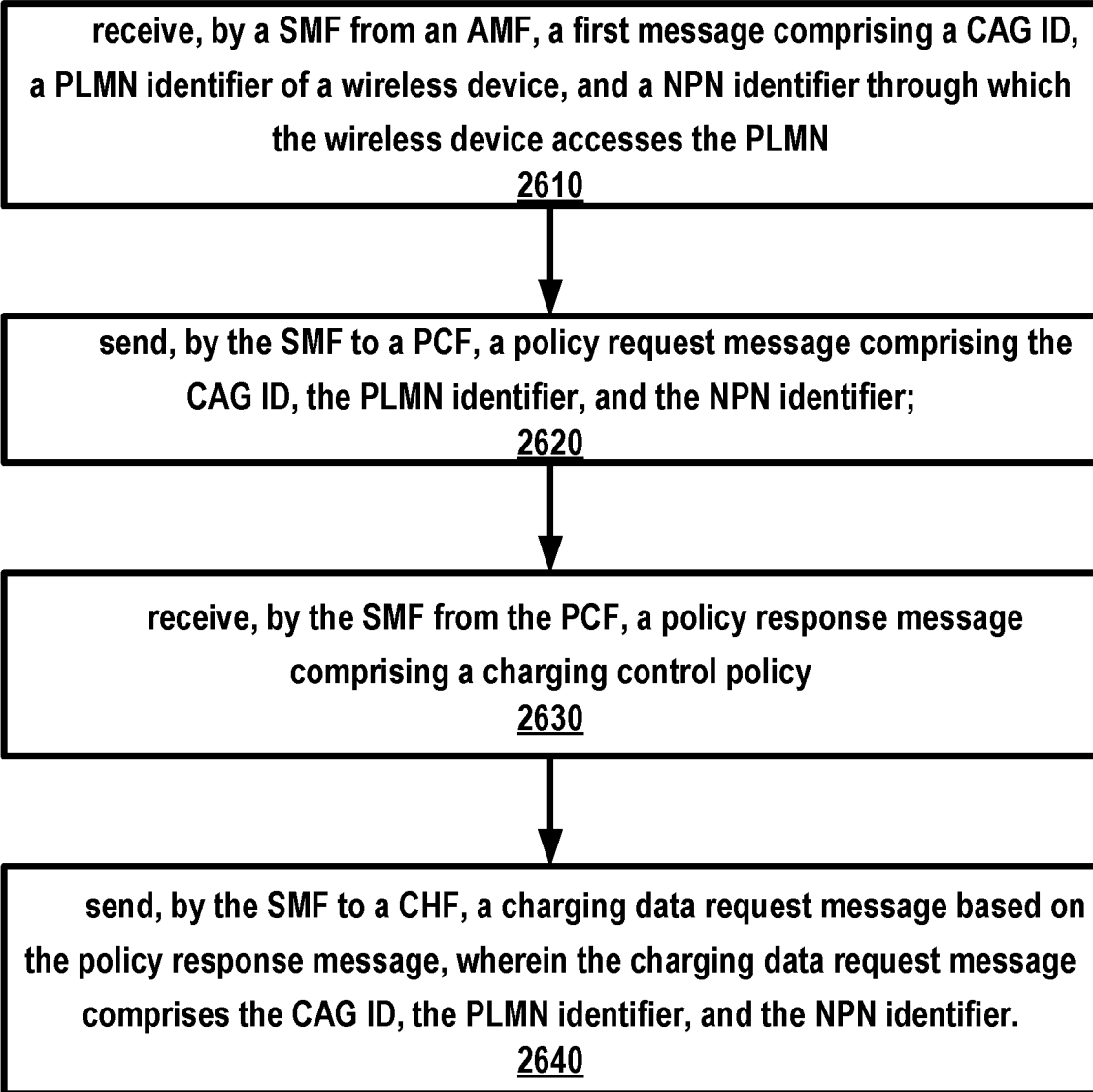
FIG. 26 is a flow diagram as per an aspect of an example embodiment of the present disclosure.

FIG. 26 is a flow diagram as per an aspect of an example embodiment of the present disclosure. At 2610, a session management function (SMF) may receive from an access and mobility management function (AMF), a first message comprising: a closed access group identifier (CAG ID); a public land mobile network (PLMN) identifier of a wireless device; and a non-public network (NPN) identifier through which the wireless device accesses the PLMN. At 2620, the SMF may send to a policy control function (PCF), a policy request message comprising: the CAG ID; the PLMN identifier; and the NPN identifier. At 2630, the SMF may receive from the PCF, a policy response message comprising a charging control policy. At 2640, the SMF may send to a charging function (CHF) a charging data request message based on the policy response message. The charging data request message may comprise the CAG ID; the PLMN identifier; and/or the NPN identifier.

According to various embodiments, the charging control policy may be determined based on at least one of: the CAG ID; the PLMN identifier; and/or the NPN identifier. According to various embodiments, the first message may further comprise at least one of: a wireless device identifier; a data network name (DNN); a single network slice selection assistance information (S-NSSAI); and/or a packet data unit (PDU) session identifier (ID). According to various embodiments, the first message may further comprise a PDU session establishment request message, wherein the PDU session establishment request message may comprises at least one of: the CAG ID; the PLMN identifier; the NPN identifier; and/or a packet data unit (PDU) session identifier. According to various embodiments, the CAG ID and/or the NPN identifier may be applied to at least one of: the wireless device; the PDU session identified by the PDU session identifier; a network slice identified by the S-NSSAI; and/or the DNN. According to various embodiments, the policy request message may further comprise at least one of: an identity of the wireless device; a data network name (DNN); a single network slice selection assistance information (S-NSSAI); and/or a packet data unit (PDU) session identifier. According to various embodiments, the PCF may send to a unified data repository (UDR), a subscription request message for a NPN, a closed access group identifier (CAG ID) or a packet data unit (PDU) session, wherein the subscription request message may comprises at least one of: the CAG ID; the NPN identifier; the PLMN identifier; a wireless device identifier; a PDU session identifier; and/or a single network slice selection assistance information (S-NSSAI). According to various embodiments, the UDR may determine, a charging control information applying to at least one of: the CAG; the NPN; the wireless device; the PDU session; the S-NSSAI; and/or the DNN. According to various embodiments, the PCF may receive from the UDR, a subscription response message comprising at least one of: a charging control information for the NPN; a charging control information for the CAG; the CAG ID; and/or the identifier of the NPN. According to various embodiments, based on the charging control information for the NPN, the PCF may determine a charging control rule for the NPN, wherein the charging control rule may comprise at least one of: a charging rate for the NPN; a charging method for the NPN; and/or an address of a charging function for the NPN. According to various embodiments, based on the charging control information for the CAG, the PCF may determine a charging control rule for the CAG, wherein the charging control rule may comprise at least one of: a charging rate for the CAG; a charging method for the CAG; and/or an address of a charging function for the CAG. According to various embodiments, the PCF may send to the SMF, a policy response message comprising at least one of: the charging control rule for the NPN; the charging control rule for the CAG; the NPN identifier; the CAG identifier; the PDU session identifier; and/or the S-NSSAI. According to various embodiments, the AMF may receive from the wireless device, a Non-access stratum message comprising at least one of: a S-NSSAI; a DNN; and/or a PDU session identifier. According to various embodiments, the AMF may receive from the wireless device, a Non-access stratum message comprising a PDU session establishment request message, wherein the PDU session establishment request message may comprise at least one of: the NPN identifier; the CAG ID; and/or a PDU session identifier. According to various embodiments, the charging data request message may further comprise at least one of: a wireless device identifier; a PDU session identifier; and/or a single network slice selection assistance information (S-NSSAI). According to various embodiments, based on the CAG ID, the CHF may determine a first quota information for the CAG, wherein the first quota information may comprise at least one of: the CAG ID; a granted unit; a time quota threshold; and/or a volume quota threshold. According to various embodiments, based on the identifier of the NPN, the CHF may determine a first quota information for the NPN, wherein the first quota information may comprise at least one of: the NPN identifier; a granted unit; a time quota threshold; and/or a volume quota threshold. According to various embodiments, the CHF may send to the SMF, a charging response message comprising the first quota information. According to various embodiments, the SMF may send to a UPF, a user plane message comprising at least one of: a user plane rule; the NPN identifier; and/or the CAG ID. According to various embodiments, the UPF may detect and collect, resource usage for the NPN or the CAG, wherein the resource usage may comprise at least one of: time usage for the NPN; volume usage for the NPN; time usage for the CAG; and/or volume usage for the CAG. According to various embodiments, the UPF may send to the SMF, the resource usage for the NPN or CAG. According to various embodiments, the SMF may send to the CHF, a second charging request message comprising the resource usage for the NPN or the CAG.

According to various embodiments, a session management function (SMF) may comprise one or more processors and memory storing instructions that, when executed by the one or more processors, cause the SMF to receive, from an access and mobility management function (AMF), a first message comprising: a closed access group identifier (CAG ID); a public land mobile network (PLMN) identifier of a wireless device; and a non-public network (NPN) identifier through which the wireless device accesses the PLMN. According to various embodiments, the SMF may comprise one or more processors and memory storing instructions that, when executed by the one or more processors, cause the SMF to send to a policy control function (PCF), a policy request message comprising: the CAG ID; the PLMN identifier; and the NPN identifier. According to various embodiments, the SMF may comprise one or more processors and memory storing instructions that, when executed by the one or more processors, cause the SMF to receive from the PCF, a policy response message comprising a charging control policy. According to various embodiments, the SMF may comprise one or more processors and memory storing instructions that, when executed by the one or more processors, cause the SMF to send to a charging function (CHF), a charging data request message based on the policy response message, wherein the charging data request message may comprise: the CAG ID; the PLMN identifier; and the NPN identifier.

According to various embodiments, a policy control function (PCF) may receive from an application function (AF), a service information provisional message, the service information provisional message may comprise: an identifier of a non-public network (NPN); an identifier of service provider public land mobile network identifier (SP PLMN); an identifier of a wireless device; service information for the wireless device; a UE IP address; and/or a DNN. According to various embodiments, the PCF may map the identifier of the SP PLMN and the service information to a packet data unit (PDU) session based on: the identifier of the NPN; the identifier of the wireless device; the UE IP address; and/or the DNN. According to various embodiments, the PCF may determine a charging control rule for the NPN and the SP PLMN, wherein the charging control rule may comprise: a charging rate for the NPN and the SP PLMN; a charging method for NPN and the SP PLMN; and/or an address of a charging function for the NPN and the SP PLMN. According to various embodiments, the PCF may send to the SMF the charging control rule.

According to various embodiments, a policy control function (PCF) may comprise one or more processors and memory storing instructions that, when executed by the one or more processors, cause the PCF to receive, from an application function (AF), a service information provisional message, the service information provisional message comprises: an identifier of a non-public network (NPN); an identifier of service provider public land mobile network identifier (SP PLMN); an identifier of a wireless device; service information for the wireless device; a UE IP address; and/or a DNN. According to various embodiments, the PCF may comprise one or more processors and memory storing instructions that, when executed by the one or more processors, cause the PCF to map the identifier of the SP PLMN and the service information, to a packet data unit (PDU) session, based on: the identifier of the NPN; the identifier of the wireless device; the UE IP address; and the DNN. According to various embodiments, a policy control function (PCF) may comprise one or more processors and memory storing instructions that, when executed by the one or more processors, cause the PCF to determine a charging control rule for the NPN and the SP PLMN, wherein the charging control rule may comprise: a charging rate for the NPN and the SP PLMN; a charging method for NPN and the SP PLMN; and/or an address of a charging function for the NPN and the SP PLMN. According to various embodiments, a policy control function (PCF) may comprise one or more processors and memory storing instructions that, when executed by the one or more processors, cause the PCF to send to the SMF, the charging control rule.

According to various embodiments, a policy control function (PCF) may receive from an application function (AF), a service information provisional message, the service information provisional message may comprise: an identifier of a close access group (CAG ID); an identifier of a service provider public land mobile network (SP PLMN); an identifier of a wireless device; service information for the wireless device; a UE IP address; and/or a DNN. According to various embodiments, the PCF may map the identifier of the SP PLMN and the service information to a packet data unit (PDU) session, based on: the CAG ID; the identifier of the wireless device; the UE IP address; and/or the DNN. According to various embodiments, the PCF may determine a charging control rule for the CAG and the SP PLMN, wherein the charging control rule may comprise: a charging rate for the CAG and the SP PLMN; a charging method for the CAG and the SP PLMN; and/or an address of a charging function for the CAG and the SP PLMN. According to various embodiments, the PCF may send to the SMF, the charging control rule.

According to various embodiments, a policy control function (PCF) may comprise one or more processors and memory storing instructions that, when executed by the one or more processors, cause the PCF to receive, from an application function (AF), a service information provisional message, the service information provisional message may comprise: an identifier of a close access group (CAG ID); an identifier of a service provider public land mobile network (SP PLMN); an identifier of a wireless device; service information for the wireless device; a UE IP address; and/or a DNN. According to various embodiments, the PCF may comprise one or more processors and memory storing instructions that, when executed by the one or more processors, cause the PCF to map the identifier of the SP PLMN and the service information, to a packet data unit (PDU) session, based on: the CAG ID; the identifier of the wireless device; the UE IP address; and/or the DNN. According to various embodiments, the PCF may comprise one or more processors and memory storing instructions that, when executed by the one or more processors, cause the PCF to determine a charging control rule for the CAG and the SP PLMN, wherein the charging control rule may comprise: a charging rate for the CAG and the SP PLMN; a charging method for the CAG and the SP PLMN; and/or an address of a charging function for the CAG and the SP PLMN. According to various embodiments, the PCF may comprise one or more processors and memory storing instructions that, when executed by the one or more processors, cause the PCF to send to the SMF, the charging control rule.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A session management function (SMF) comprising: one or more processors; and memory storing instructions that, when executed by the one or more processors, cause the SMF to:
   send, to a policy control function (PCF), a policy request message comprising:
      a non-public network (NPN) identifier of an NPN through which a wireless device accesses a public land mobile network (PLMN); and
      a PLMN identifier of the PLMN; and
   receive, from the PCF, a policy response message comprising a charging control policy.

2. The SMF of claim 1, wherein the instructions further cause the SMF to receive, from an access and mobility management function (AMF), a message comprising one or more of the NPN identifier and the PLMN identifier.

3. The SMF of claim 2, wherein the message comprises at least one of:
   a data network name (DNN);
   a single network slice selection assistance information (S-NSSAI); and
   a packet data unit (PDU) session identifier.

4. The SMF of claim 2, wherein the sending the policy request message is based on the receiving the message from the AMF.

5. The SMF of claim 1, wherein the instructions further cause the SMF to send, to a charging function, a charging data request message based on the policy response message.

6. The SMF of claim 5, wherein the charging data request message comprises the PLMN identifier.

7. The SMF of claim 1, wherein the policy request message further comprises at least one of:
   a wireless device identifier of the wireless device;
   a data network name (DNN);
   a single network slice selection assistance information; or
   a packet data unit session identifier.

8. The SMF of claim 1, wherein the policy response message comprises at least one of:
   a charging control rule;
   the NPN identifier;
   a single network slice selection assistance information (S-NSSAI); and
   a packet data unit (PDU) session identifier.

9. The SMF of claim 1, wherein the instructions further cause the SMF to determine one or more user plane rules for the NPN based on the charging control policy.

10. The SMF of claim 9, further comprising sending the one or more user plane rules for the NPN to a user plane function (UPF).

11. A policy control function (PCF) comprising: one or more processors; and memory storing instructions that, when executed by the one or more processors, cause the PCF to:
   receive, from a session management function (SMF), a policy request message comprising:
      a non-public network (NPN) identifier of an NPN through which a wireless device accesses a public land mobile network (PLMN); and
      a PLMN identifier of the PLMN; and
   send, to the SMF, a policy response message comprising a charging control policy.

12. The PCF of claim 11, wherein the instructions further cause the PCF to determine the charging control policy.

13. The PCF of claim 12, wherein the determining the charging control policy is based on the NPN identifier.

14. The PCF of claim 12, wherein the determining the charging control policy is based on the PLMN identifier.

15. The PCF of claim 12, wherein the instructions further cause the PCF to send, to a unified data repository (UDR), a subscription request message comprising the PLMN identifier and the NPN identifier.

16. The PCF of claim 15, wherein the instructions further cause the PCF to receive, from the UDR, charging control information for the NPN.

17. The PCF of claim 16, wherein the instructions further cause the PCF to determine a charging control rule for the NPN based on the charging control information for the NPN received from the UDR.

18. The PCF of claim 16, wherein the determining the charging control policy is based on the charging control information for the NPN received from the UDR.

19. The PCF of claim 11, wherein the policy request message further comprises at least one of:
 a wireless device identifier of the wireless device;
 a data network name;
 a single network slice selection assistance information; or
 a packet data unit session identifier.

20. A non-transitory computer-readable medium comprising instructions that, when executed by one or more processors, cause the one or more processors to:
 send, to a policy control function (PCF), a policy request message comprising:
  a non-public network (NPN) identifier of an NPN through which a wireless device accesses a public land mobile network (PLMN); and
  a PLMN identifier of the PLMN; and
 receive, from the PCF, a policy response message comprising a charging control policy.

* * * * *